United States Patent [19]
Deskins

[11] Patent Number: 5,611,921
[45] Date of Patent: Mar. 18, 1997

[54] SEWAGE DEWATERING PROCESS AND EQUIPMENT

[76] Inventor: Franklin D. Deskins, 23 Fairway Dr., Alexandria, Ind. 46001

[21] Appl. No.: 636,675

[22] Filed: Apr. 23, 1996

Related U.S. Application Data

[62] Division of Ser. No. 419,289, Apr. 10, 1995.

[51] Int. Cl.[6] .............................. C02F 1/52; C02F 11/12; B01D 33/72
[52] U.S. Cl. ..................... 210/195.1; 210/219; 210/206; 210/241; 366/136; 366/276
[58] Field of Search .................... 210/712, 724, 210/225, 194, 195.1, 195.3, 199, 202, 205, 206, 219, 241; 366/136, 150, 152, 159, 160, 276

[56] References Cited

U.S. PATENT DOCUMENTS

| | | | |
|---|---|---|---|
| 4,522,502 | 6/1985 | Brazelton | 366/160 |
| 4,642,222 | 2/1987 | Brazelton | 422/111 |
| 4,688,945 | 8/1987 | Brazelton | 366/156 |
| 4,778,280 | 10/1988 | Brazelton | 366/136 |
| 4,925,019 | 5/1990 | Ganz et al. | 206/145 |
| 5,018,871 | 5/1991 | Brazelton et al. | 366/168 |
| 5,061,456 | 10/1991 | Brazelton et al. | 422/134 |
| 5,164,429 | 11/1992 | Brazelton et al. | 523/322 |
| 5,248,416 | 9/1993 | Howard, Jr. | 210/195.1 |
| 5,252,635 | 10/1993 | Brazelton et al. | 523/313 |
| 5,284,626 | 2/1994 | Brazelton et al. | 422/135 |
| 5,284,627 | 2/1994 | Brazelton et al. | 422/135 |

OTHER PUBLICATIONS

"Control of Pathogens and Vector Attraction in Sewage Sludge", EPA/625/R–92/013, (Dec. 1992), title page and p. 37.

*Primary Examiner*—Thomas G. Wyse
*Attorney, Agent, or Firm*—Fisher, Christen & Sabol

[57] ABSTRACT

A process of dewatering primary-treated sewage which includes mixing the sewage with a coagulant or flocculant aid, usually activated polymer. The sewage is then mixed and flocculated at conditions which involve extensive mixing turbulence of the sewage and whereby part of the sewage is recycled so as to be again subjected to such mixing and flocculating. Flocks form the solid particles in the sewage. The pH of the sewage is chemically adjusted into the basic pH range or to a higher basic pH. The sewage is applied to a sand bed whereby the flocculated solids in the sewage are separated from the liquid in the sewage, by collecting on the top of the sand bed. The flocculated solids located on the top of the sand bed are air dried. The dried flocculated solids are removed from the top of the sand bed.

9 Claims, 12 Drawing Sheets

SEWAGE DEWATERING PROCESS AND EQUIPMENT

This is a divisional application of Ser. No. 08/419,289, filed on Apr. 10, 1995.

BACKGROUND OF THE INVENTION

1. Field of the Invention

The invention relates to a sewage dewatering process and equipment to carry out the process.

2. Background Art

Sewage is composed of the liquid and water-carried wastes from residences, commercial buildings, industrial plants, and institutions, together with any groundwater, surface water and storm water which may be present. The terms "wastewater" and "sewage" are sometimes used interchangeably herein.

The composition of sewage depends on its origin and the volume of water in which the wastes are carried. Sewage which originates entirely from residential communities is made up of excreta, bathing and washing water, and kitchen wastes. Other wastes can be present from rural/agricultural sources and/or industrial or commercial establishments.

Modern sewage treatment is generally divided into three phases: primary, secondary and tertiary. Each of these steps produces sludge, which can be disposed of or used for various purposes.

Primary treatment, or plain sedimentation, removes only the settleable solids from sewage. A modern system for primary treatment entails collecting the sewage, conveying it to a central point for treatment, using both screens to remove large objects and grit chambers to remove grit, and using primary sedimentation tanks to remove the suspended settleable solids. This type of system produces about one third of a gallon of wet sludge per person per day, and facilities for handling and disposing of the sludge are also needed. Primary treatment reduces the concentration of suspended solids by about 60 percent and reduces the BOD (biochemical oxygen demand) by about 35 percent.

Secondary treatment involves the addition of a biological treatment phase following plain sedimentation. At best, this treatment removes about 85 to 95 percent of the organic matter in sewage. It has little effect on dissolved materials or on the nutrients that stimulate the growth of algae in the receiving waters. It also discharges all of the nutrients and dissolved solids, as well as any contaminants which may be added to the water by industrial plants.

There are two basic methods of often used in modern secondary treatment, that is, the trickling filter and the activated-sludge processes. In small communities, secondary treatment is sometimes accomplished by either the trickling-filter method or the contact bed method, but usually used is the sand filter method. In larger communities, secondary treatment is generally accomplished by the activated-sludge process.

Sand filters are beds of fine sand, usually 3 feet (1 meter) deep, through which the sewage slowly seeps. As it seeps through the sand, the organic matter is decomposed and stabilized by the microorganisms in the sewage. Sand filters require about 4 acres (1.6 hectares) of sand beds for each thousand people. Because of this large space requirement, sand beds have obvious disadvantages. Also, the time required for the sludge to be formed and dried usually takes weeks. This long drying time means that large surface areas of sand beds have to be used to achieve drying with the attendant large cost of constructing, operating and maintaining the sand beds. Rain adds time to the drying function of sand beds, since the sand beds usually are without any roof or other top covering. Covered sand beds require less area than do uncovered beds but still take weeks to achieve drying and have a higher construction cost. Nowadays, about 90 percent of smaller municipalities use sand beds to dewater sewage coming from primary treatment units. The main purpose of sand beds is the reduction of the water content in the primary-treated sewage.

A contact bed, composed of many layers of stone, slate or other inert material, provides a relatively large surface area for the growth of microorganisms. It operates on a fill-and-draw basis, and the organic matter delivered during the fill period is decomposed by the microorganisms on the bed. The oxygen required by the microorganisms is provided during the resting period, when the bed is exposed to the air.

In the trickling filter system, the sewage is applied to the filter through rotary distributors and, then, is allowed to trickle down over large stone or plastic beds that are covered with microorganisms. The beds are not submerged and, thus, air can reach the organisms at all times. The area requirements for trickling filters are about 5 to 50 acres (2 to 20 hectares) per million people.

In the activated-sludge process, heavy concentrations of aerobic microorganisms, called biological floc or activated sludge, are suspended in the liquid either by agitation which is provided by air which is bubbled into the tank or by mechanical aerators. Final sedimentation tanks are needed to separate the floc material from the flowing liquid. Most of the biologically active sludge, then, is then returned to the aeration tank with which to treat the incoming water. The high concentration of active microorganisms which can be maintained in the aeration tank permits the size of the treatment plant to be relatively small, about 1 to 5 acres (0.1 to 2 hectares) per million population.

Tertiary treatment is designed for use in areas either where the degree of treatment must be more than 85 to 95 percent or where the sewage, after treatment, is reused. It is mainly intended to further clean or polish secondary treatment plant effluents by removing additional suspended material and by lowering the BOD, generally by filtration. This polishing, however, has little impact on the dissolved solids, including the nutrients, synthetic organic chemicals, and heavy metals. To eliminate these constituents of sewage, other methods of treatment have been devised. These processes include coagulation and sedimentation, precipitation, adsorption on activated carbon or other adsorbents, foam separation, electrodialysis, reverse osmosis, ion exchange and distillation.

Sludge is the semiliquid mass removed from the liquid flow of sewage. Sludge will vary in amount and characteristics with the characteristics of sewage and plant operation. Sludge from primary treatment is composed of solids usually having a 95 percent moisture content. The accumulated solid materials, or sludge, from sewage treatment processes amount to 50 to 70 pounds (22 to 31 kg) per person per year in the dry state or about one ton (0.9 metric ton) per year in the wet state. Sludge is highly capable of becoming putrid, and can, itself, be a major pollutant if it is not biologically stabilized and disposed of in a suitable manner. Biological stabilization may be accomplished by either aerobic or anaerobic digestion. After digestion, sludge-drying beds are usually used.

In modern sewage treatment plants, mechanical dewatering of sludge by vacuum filters, centrifuges, or other devices is becoming widespread. The dewatered sludge, then, may be heat-dried, if it is to be reclaimed, or it may be incinerated. In large communities where large amounts of sludge are produced, mechanical dewatering and incineration are commonly practiced. But there are many smaller communities, rural areas, etc., which have economic constraints and which use the sand bed method to dewater sewage. There is a great need to make the sand bed method more economical by reducing the time for drying waste material (sludge) from the primary-treated sewage effluent and by reducing the time for drying the sludge. Reduced drying time would allow reduction of the size of the sand beds needed.

Early sludge treatment schemes included plain sedimentation, followed by chemical precipitation or sedimentation aided by flocculation chemicals. Chemical precipitation fell into disuse, but may be making a comeback. Nowadays, chemicals are often added to the sewage to promote the coagulation of the finer suspended solids, so that these solids become heavy enough to settle in sedimentation in the primary treatment stage. Typical chemical coagulants in the flocculation of sewage are alum, polymers, ferric sulfate, ferric chloride and lime.

Chlorine is often used to minimize odors from sedimentation tanks and in the final effluent as a disinfectant.

U.S. Pat. No. 5,248,416 (Howard) discloses a sewage treatment system which presents a main flow line and a recirculating line, the former for floc which has appreciated in size due to the addition of a polymer and to passage through an area of agitation/turbulence, and the latter for the return of small sized floc to the agitator/turbulence area for size increase. The passageways of the system include movable flaps which serve recirculation purposes, and a ledge or flutter for current creation and floc build-up. Raw liquid sewage enters the system, whereas the outlet leads to a belt press and/or a dry bed to cake the resulting sludge. More specifically, the apparatus for flocculating fluids containing suspended solids comprises conduit means for conducting the fluid to an outlet in the conduit means. There is means introducing a flock-producing agent into the fluid in the conduit means, a vertical drop in the conduit means downstream from the means introducing the flock-producing agent, and a movable mounted ledge means in the vertical drop which serves to increase turbulence and to increase the size of accumulating floc in the fluid. There is a vertical rise in said conduit means, downstream from the vertical drop leading to the outlet. The conduit means includes means connecting the vertical drop to the vertical rise, and there are circulation passageway means connecting the vertical rise to the vertical drop for recirculating smaller size flock to the vertical drop.

In Howard, it is said that a particular feature is that no mixer equipment is required. Polymers are injected into the raw sewage, causing water to separate from the raw sewage during the procedure, resulting in floc build-up. The latter is caused when the polymers begin dissolving with the result that a film of concentrated polymer solution builds up about the polymer particles, forming aggregates or agglomerations, identified as "flocks". Turbulence is a key factor, where such is said to be accomplished through a ledge (which flutters) located in the vertical drop conduit and a series of movable flaps disposed within the recirculating conduit. The singular stated purpose of the Howard scheme is to create flock, i.e., solids with a minimum of water content, through separation. Restated otherwise, the Howard scheme, through turbulence or tumbler-mixer action, is said to create additional floc (of a larger size) which goes to output, whereas smaller floc is caused to recirculate said increase, thereby, in size for repeated passage to output.

BROAD DESCRIPTION OF THE INVENTION

An object of the invention is to overcome the above-mentioned disadvantages and problems of the prior art sewage dewatering treatment processes. Another object of the invention is to provide process-schemes and equipment whereby the size and/or number of sand bed(s) needed can be greatly reduced. Another object of the invention is to provide process-schemes and equipment whereby the time to dewater sewage and drying the sludge is greatly reduced. A further object of the invention is to provide process-schemes and equipment whereby the dried sludge obtained from dewatered sewage has a greatly reduced water content. Another object of the invention is to provide a mixer-flocculator which can be used to flocculate particles dissolved in a liquid. Another object of the invention is to provide a pneumatic deliquiding unit which can be used to remove liquid from a solution containing solid particles. Another object is to provide equipment for removing a layer of solid material in particulate form from on top of a layer of solid particulate material such as sand. Other objects and advantages of the invention are set out herein or are obvious herefrom to one skilled in the art. the sewage dewatering treatment process of the invention.

The invention involves a process-scheme for dewatering sewage, usually previously subjected to primary treatment, to obtain dried sludge. Solids are dissolved, suspended, etc., in the liquid sewage. The process includes: (a) mixing the sewage with a coagulant or flocculant aid; (b) mixing and flocculating the sewage from step (a) at conditions which involve extensive mixing turbulence of the sewage and whereby part of the sewage is recycled so as to be again subjected to such mixing and flocculating, flocks being formed from the solid particles in the sewage; (c) chemically adjusting the pH of the sewage from step (b) into the basic pH range or to a higher basic pH; (d) applying the sewage from step (c) to a sand bed whereby the flocculated solids in the sewage from step (c) are separated from the liquid in sewage from step (c), by collecting on the top of the sand bed, and drying the flocculated solids located on the top of the sand bed; and (e) removing the dried flocculated solids from the top of the sand bed. The sewage is usually supplied to step (a) under sufficient pressure/head (by means of a pump or line pressure) to travel completely through the process sequence without the need for an auxiliary pump(s) can be used if desired.

Dewatering sludge at wastewater treatment plants has traditionally been a major operational concern. Most large operations use mechanical filter presses to efficiently dewater their sludge. For smaller operations this equipment is too expensive and too large for their needs. Therefore, small facilities rely on said filter drying beds for sludge dewatering. This is an excellent method to process sludge; however, most beds were designed without inline dewatering (liquid-solid-separation) or an easy and automated way to remove dried sludge. Expensive time-consuming manual labor has been a tremendous burden to plant operation. The invention process and equipment solves the old sludge bed problems. With simple and easy modifications of existing beds, old non-productive beds can be upgraded to good dewatering devices. The invention process and equipment allows any wastewater treatment plants to change their sludge build-up problem to a modern and cost effective method to dewater, dry and remove sludge.

The invention process also includes an optional step of dewatering the sewage using an inline pneumatic dewatering tube between steps (a) and (b) or (b) and (c) or (c) and (d), or before step (a). Use of the vertically-situated pneumatic dewatering device or tube involves conducting the sewage into the central tube-shaped filter where solids in the sewage are caught on the filter and some of the water in the sewage passes through the filter. Air under pressure is blown against the outer surface of the filter to dislodge the solids collected on the inner surface of the filter. The blowing air sources are alternated in on-off sequences in order to continuously provide regions of the filter for the water to come through unimpeded by blowing pressurized air. The thickened or concentrated sewage passes on to the next process step or operation.

The invention also involves the processes for dewatering primary-treated sewage which comprised (1) above-noted steps (a). (b) and (c), or (2) above-noted steps (a) and (b), or (3) above-noted steps (b) and (c), or (4) above-noted step (b).

The first step/stage in the invention process-scheme uses an inline polymer mixing-feeding (injection) system to incorporate activated polymer into the sewage flow line. The inline polymer preparation system eliminates this need for batching tanks, mixers and polymer transfer pumps. The inline polymer system can be a conventional one or preferably is the novel inline polymer mixing-feeding system of the invention. The novel inline polymer system (chemical pump) of the invention activates precise amounts of neat polymer and water, then meters the fully activated stock solution to the point of use without the need of transfer pumps. The benefits achieved by the novel inline polymer system include:

(A) Fully automated—any polymer—any application;

(B) Full polymer activation and little or no waste;

(C) Reduces labor and maintenance costs;

(D) Saves space—is portable; and (E) Simplifies operation and improves safety.

The polymer mixing-feeding (injecting) system is an integrated equipment package which automatically meters, activates, dilutes and feeds liquid polymer and water. Concentrated polymer and water are blended in a complete high energy chamber.

The prepared solution (neat polymer and water) exits the original chamber through the top of the vessel. It shall then re-enters an outer retention chamber and exits the chamber at the bottom of the vessel. A round access plate is fabricated in the bottom of the primary chamber for repair and service. The chamber can be constructed of polyvinyl chlorides, stainless steel or any other suitable material. The polymer is injected into the chamber through a tube passed through the top of the chamber. The tube is designed to be adjustable in length giving variations in depth or placing the polymer closer to the aspirator or mixing energy. At the end of the tube, a spring loaded check valve allows polymer to spray into the mixing area in a thin filming process. Energy for polymer activation is created by ⅝ inch or any size stainless steel hollow shaft which at the end of the shaft is a polyvinyl chloride or stainless steel 4-way aspirator. Turning at 3,450 rpm a tremendous vacuum occurs drawing free air down the shaft into the chamber. This process causes high energy mixing. The stainless steel shaft is driven by a hollow core motor. The system activates the polymer and meters the activated polymer—water solution to the point of use without the need of transfer pumps.

The motor and shaft are attached by a coupler. The ⅝ inch or any size shaft with aspirator is placed inside the chamber and that chamber is made water tight with exterior mechanical seals. Inline check and ball valves are installed on the top or inlet side of the motor. These valves can regulate the amount of air passed through the shaft to the mixing chamber. The one way directional flow check valve is used to prevent liquid from exiting through the aspirator and shaft when the motor is in the off position. The mixer has a brass solenoid valve for on/off control of dilution water supply, and a rotameter-type flow indicator equipped with integral rate-adjusting valve. The flow indicator is machined acrylic and has valve stop and guided float. Water flow rate is adjustable 0 to 500 USGPH. Water supply input and stock solution output fittings are 0 to 500 FNPT. The drive motor of the unit is powered by a 2500 watt generator producing 12OV-15 amps. The generator is mounted to the trailer and becomes a permanent fixture of the transportable system.

The polymer is an emulsification of long chain organic polymer in oil. The water and mixing opens up or uncoils the polymer to expose charge sites in the polymer chain.

Coagulants or flocculants, such as, alum, ferric sulfate, ferric sulfate, ferric chloride and lime, can be used in place of the activated polymer in the sewage flow line to coagulate or flocculate the solids in the sewage. These coagulants or flocculants cause formation of an insoluble precipitate which adsorbs colloidal and suspended solids.

The second step/stage in the invention process-scheme uses an inline mixing flocculator. A novel inline mixing-flocculating device is used to enhance the chemically induced liquid-solids separation in the sludge dewatering process utilized at most wastewater treatment plants. The flocculator is used in any type of mechanical dewatering scheme that uses a chemical as a coagulant or flocculant aid. The overall output and efficiency of the dewatering process is greatly increased by the thoroughness of the flocculating process. Prior art sludge production normally is 14,000 to 16,000 gallons of dewatered sludge per gallon of polymer; the invention mixer-flocculator unit provides a reduction of 40 to 60 percent in polymer consumption. The benefits achieved by the inline mixing-flocculating device include:

(A) Increases sludge production;

(B) Decreases polymer usage;

(C) Increases drying bed holding capacity; and (D) Decreases sludge drying time.

The prepared activated polymer exits the polymer preparation system and is passed into the mixer-flocculator unit. Preferably, the mixer-flocculator unit has multiple injector ports at the influent end of the mixer through which the activated polymer solution can be injected into the liquid-sludge slurry flow stream. The activated polymer and sludge is quickly yet gently mixed by baffling energy dispersing action. The mixing action promotes large floc growth. A portion of the flocculated sludge is re-circulated into the influent stream by a pressure drop zone to advance and increase the efficiency of the mixing-flocculating process.

The mixer-flocculator unit includes, in the down section above the recycle pipe, an adjustable, nonflexible baffleplate which is positioned at an angle. The adjustment can be controlled by hand adjustment means or electrically operated means. The baffleplate restricts the flow in the down pipe by about 50 to about 80 percent, thus increasing the original flow velocity by as much as 600 percent. With a lower sewage flow rate, a thinner throat is usually used; with a higher flow rate, normally a wider throat is provided with the adjustable baffle plate. Then, the pattern of flow is fanned in one direction. Thereafter, it is oppositely directed and fanned by a fixed baffle which restricts about 40 percent of the vessel's size. Then, the flow is directed into a 45 degree round angle causing the flow to turn and pass under and over and under fixed baffles in a serpentine flow pattern, which is reducing the vessel's velocity. The flow, then, enters a 45 degree round angle which causes the flow to move in a spiraling pattern which, then, comes in contact with a fixed baffle. As the flow exits the mixer-flocculator unit, it passes a horizontal pipe which causes a portion of the flow to divert through this line by the pressure drop caused by the adjustable inlet baffle. The bypass velocity may be increased if the size of the pipe is increased and with baffleplate adjustments.

As the liquid/solids content exits the inline mixer-flocculator, an electronic driven diaphragm pump or gear driven pump pumps liquid caustic into the discharge line of the mixer-flocculating system.

Benefits of use of the mixer-flocculator system described herein are numerous. The better the mixing, the better the flocculation. It is a new type of in-line mixing-flocculating system used to enhance the chemically induced liquid-solids separation in the sludge dewatering process utilized at most wastewater treatment plants. The mixer is capable of being utilized in any type of mechanical dewatering scheme which uses a chemical as a coagulant or flocculant aid. Typically, polymers are used at most wastewater treatment plants and are fully activated prior to being injected into the sludge slurry. The instant mixing-flocculating system performs the task of mixing the activated polymer solution with the sludge more rapidly and effectively because of a cascading "waterfall" flow pattern with strategically placed baffleplate, baffles and a baffled recirculating line. The mixer can be used in plants using sand drying beds, belt filter presses or centrifuges for partial dewatering of the sludge-slurry. The mixing-flocculating system shall be capable of increasing the overall output and efficiency of the dewatering process. A summary of the benefits of the use of the mixer-flocculator unit would include: increased sludge production, decreased polymer usage, increased drying bed holding capacity, decreased sludge drying time and a unit which will not clog and has multiple clean out ports.

The mixing-flocculating system shall consist of a single manufactured mixing-flocculating device capable of providing a rapid mix of the activated polymer and sludge slurry followed by a detention chamber of sufficient volume to provide enhancement of floc growth within a single unit. The device shall provide for partial re-circulation of previously flocculated sludge into the influent sludge slurry stream. The mixing-flocculating device shall be a controlled reduced velocity type.

The device preferably fabricated primarily utilizing corrosion free polyvinyl chloride components or other art suitable material such as stainless steel. The device does not have any mechanically moving parts (except for the adjustable baffleplate) and is designed to require minimum maintenance. The mixing device also is designed to minimize clogging and can be self regulating or manual or electrically driven, regardless of flow, sludge characteristic or polymer dosage. Model RF8 is rated at 0 to 700 gallons per minute. Model RF6 is rated at 0 to 200 gallons per minute.

The mixing-flocculating system is a single manufactured mixing-floccluating device capable of providing a rapid mix of the activated polymer and sludge slurry followed by a detention chamber of sufficient volume to provide enhancement of floc growth within a single unit. The device provides for partial recirculation of previously flocculated sludge into the influent sludge slurry stream. The mixing-flocculating device is a reduced velocity type. The system is an inline mixing-flocculating device used to enhance the chemically induced liquid-solids separation in the sludge dewatering process utilized at most wastewater treatment plants. The mixing device is capable of being utilized in any type of mechanical dewatering scheme that uses a chemical as a coagulant or flocculant aid. The system performs the task of mixing activated polymer with a ½ to 8 percent solids liquid-sludge slurry rapidly and effectively. The system performs effectively in plants using sand drying beds, belt filter presses or centrifuges for partial dewatering of the sludge slurry. The mixing-flocculating system is capable of increasing the overall output and efficiency of the dewatering process. The system has multiple injector ports at the influent end of the mixer through which the activated polymer solution can be injected into the liquid-sludge slurry flow stream. The activated polymer and sludge are quickly but gently mixed by a tumbling, cascading, energy dispersing action. The mixing action promotes large rapid floc growth. A portion of the flocculated sludge is circulated back into the influent stream to advance and increase the efficiency of the mixing-flocculating process.

The third step/stage in the invention process-scheme is a chemical induced pH adjustment of the sewage exiting the mixer-flocculating system. Liquid caustic, lime or other suitable base is injected into the discharge side of the mixer-flocculator unit and the temperature of the water to the inline polymer system is increased, thereby increasing the liquid/solids pH balance.

As the liquid/solids content exits the inline mixer-flocculator unit, an electronic driven diaphragm pump or gear driven pump pumps liquid caustic or lime into the discharge line of the flocculator-mixer unit. The pH of the sludge is increased to 12 by the chemical. The pH of the sludge will remain at 12 for 72 hours, and, during this period of time, the temperature will reach 52° C. and will remain at that temperature for at least 12 hours. At the end of the 72 hour period during which the pH of the sludge is above 12, the sludge can then be air dried to achieve a percent solids of greater than 50 percent. The liquid caustic or lime pump is present on the transportable dewatering trailer with the mixer-flocculating system and the polymer feed system and, thus, is easily transported.

The benefits achieved by this third step/stage include:

(A) Federal 503 Regulations are met;

(B) expensive sludge handling procedures are hereby deleted; and (C) expensive ovens or automated lime distribution systems are not used.

The fourth step/stage in the invention process-scheme uses a sand (grid) cell in a sand bed used for dewatering sludge. The sand-cell is grid used to stabilize filtration media in any new or existing sand drying bed. It is preferably manufactured of heavy-duty polyethylene. Preferably the sand grid is honeycomb or similar shaped. The fixed media (i.e., grid) is best installed in the filtration sand about six inches below the surface. Under load, the sand-cell generates powerful lateral confinement forces and sand-to-cell or stone-to-cell frictions. This process creates a bridging with high flexural strength and stiffness. The sand-cell greatly enhances the dewatering process. Plant operators can drive an end or front loader or tractor over the entire bed thereby significantly reducing cleaning time and eliminating expensive manual labor. Surface and subsurface bed stabilization is achieved using the invention grid. This allows for 100 percent manueverability of equipment, eliminates surface and subsurface compaction of the sand media and produces an excellent drainage environment. 100 percent saturation and drainage within about 10 minutes from start to pouring of the sewage results from the use of the grid. The benefits achieved by the sand-cell include:

(A) Directly supports front-end loaders or tractors allowing them to drive directly on the sludge drying bed without destroying the integrity of the filtration sand;

(B) Prevents lateral slippage or shear of the filtration media (grid);

(C) Reduction in filtration media replacement costs;

(D) Loading and cleaning time is significantly reduced;

(E) Uses standard washed sand or "P" gravel for rapid dewatering versus expensive, conventional drying bed materials;

(F) Square foot installation cost reduced by 94 percent over fixed media system; and (G) Total maintenance costs are reduced by more than 75 percent.

This step of the invention involves use of a sand-cell media to stabilize filtration sand/media in any new or existing sand drying bed (best constructed of concrete).

A standard sand-cell section may have nominal dimensions of eight feet wide by twenty feet long by six inches deep. However, a standard sand-cell section can have any length, width and height to fully fit into the dimensions of the sand cell in case. All of the individual sand-cells forming a sand-cell section, generally, are uniform in shape and size. Preferably, the individual sand-cells are about 6 inches wide, 6 inches long, about 6 inches deep, hexagonal in shape and, together, form a honeycomb. The honeycomb is one of the strongest, yet lightest, shapes found in nature. A standard sand-cell section can be made from high-density polyethylene plastic, any other suitable plastic or resin, stainless steel, fiberglass, concrete, wood, or any other suitable metal or material, or any form of fabricated steel, preferably high-density polyethylene plastic.

The sand-cell media is advantageously installed in the filtration sand or stone with its top surface most preferably about six inches, preferably not more than 12 inches or less than 2 inches, below its surface of the sand. Under load, the sand-cell media generates powerful lateral confinement forces and stone or sand to cell frictions. This process creates a bridging with high flexural strength and stiffness.

The benefits of using sand-cell media are numerous. A subsurface which includes sand-cell media does not compact which allows the free water to pass quickly through the media. The high flexural strength and stiffness of a subsurface which includes sand-cell media allows equipment such as end loaders to drive directly onto the entire sludge drying bed without destroying the integrity of the filtration sand. This, in turn, significantly reduces the loading and cleaning time, and eliminates expensive manual labor. Other benefits of using the sand-cell media described herein include: lateral slippage or shear of the filtration media is prevented; filtration media replacement costs are reduced; economical standard washed sand or "P" gravel for rapid dewatering can be used (as opposed to conventional drying bed materials); square foot installation costs are reduced by ninety-four percent over the fixed media system; and total maintenance costs are reduced by more than seventy-five percent.

The fourth step of the instant invention includes an inline mixing in a mixer-flocculator unit (which is part of a mixer-flocculating system) on a trailer. The purpose of having the mixer-flocculating system on a trailer is the ability to transport a complete dewatering system to a site to dewater sludge for drying bed application. In general, this sort of equipment should be transportable to prevent it from freezing and being damaged when exposed to the elements. Permanent installation of this sort of equipment in adjacent buildings is not suitable, because formed floc will separate and self-destruct if it (in sludge) is pumped or travels even as little as a few hundred feet. In contrast, the mixer-flocculating system on a trailer is designed to properly activate the polymer and go through the flocculation process for immediate use at the point of application. The instant invention includes a complete flocculation system (including inline flocculation, a polymer feed system, a liquid caustic pump and all accessories) on a heavy duty utility trailer.

The fifth step/stage in the invention process uses a sludge retriever to separate the dried sludge layer from the sand in the sand bed. The sludge retriever is designed to fit any adequately rated (front-end) loader and is powered by the hydraulic system of the loader. Easily operated by one person, the retriever's rotary drum of the efficiently breaks up (chops) solid waste and propels it into a hopper. The sludge is chopped into very small granular particles, enhancing transportation and handling cost. The unique combing action of the rotating drum (preferably having 3-inch adjustable tines) not only removes sludge without significantly disturbing the filtering sand, it also levels the bed surface to promote uniform drying. Each bucketload of sludge removed by the sludge retriever usually will only yield an insignificant amount of sand for precision sludge clean-up. The sludge retriever (automated) makes sludge removal and drying bed preparation a one-man, one-machine operation. It also levels and aerates the sand bed for the next pouring of sewage into the sand bed.

The sludge removal attachment is capable of removing dried wastewater sludge from sand drying beds. The implement is also capable of being attached to the front end loader. The mechanism has, for example, a two cubic yard bucket, constructed of ¼ inch steel, and a shaft-type rotary drum having multiple three inch tines. The unit is furnished with an expanded steel cover for the rotor and bucket. Rotor end plates are ½ inch steel minimum. The rotary action of the drum accomplishes several functions. First, it removes the sludge layer. Second, it simultaneously levels the surface of the drying bed. Third, by reversing the direction of the rotary drum, the sand bed can be aerated to a depth of three inches. Basically, sludge is removed by passing the unit over the drying bed and sweeping up the dried sludge.

Typical specifications are as follows: The overall width of the mechanism best not exceed 82 inch and the working width best not exceed 74 inch. The drive motor can best be 8 HP minimum and bi-directional. The drive chain should be #60 HD and the unit should be furnished with a closed metal cover for the chain drive. Hydraulic requirements for the unit should be 9 to 14 GPM at 1800 to 2200 PSI. The total weight can be 1000 pounds. The rotor construction can be shaft type with multi 3" tines. The hydraulic drive motor can be bi-directional 8–10 HP. The drive chain can be #60 HD. The rated capacity can be ¾ yds. light material. The rotor adjustment can be cam type 1"–3".

Alternatively, the sludge removal attachment (retriever) is capable of removing air-dried wastewater sludge from the sand bed. The unit is a bucket or scoop type device. Sludge is removed by passing the unit over the drying bed and scooping up the dried sludge.

Safety features typically include: an expanded metal cover for the rotor and bucket; a metal cover for the chain drive; ⅜" steel rotor support; and pinch points identified.

The benefits achieved by the sludge retriever include:

(A) Ending expensive or greatly reducing manual labor;
(B) Sand removal is minimal;
(C) Leveling bed surface to promote uniform drying;
(D) Aeration of the sand; and
(E) One-man, one-machine operation.

The optional sixth step/stage in the invention process uses a sewage thickening or concentration unit which is a pneumatic dewatering device or tube. Liquid can be removed from the sewage by passing the liquid/solid through a screen causing liquid discharge. The screen is constantly cleaned by air injection. This process can be repeated over and over producing a true inline thickening process, that is the concentration of solids in the flowing sewage. The inline sewage dewatering device can be used before the first step in the invention process or between the first and second steps or the second and third steps or the third and fourth steps of the process.

Besides the dewatering of sewage, the pneumatic dewatering device or tube can be used to concentrate or deliquid (or dewater) solutions of any liquid containing solids. The solutions which can be concentrated can be, for example, in the chemical, pharmaceutical, mining, paper making, etc., industries. The device is useful with processes where influents, effluents, liquid bylines, etc., need to have the solids content increased.

Basically, in the invention dewatering process, the inline pneumatic dewatering tube allows part of the liquid in the flowing sewage to exit the side of the vessel through a reinforced membrane wall. As the sewage flow passes through the vessel in a vertical direction, static head occurs. Liquid will exit through the membrane wall until it clogs. To prevent this from happening, air nozzles spray on every square inch of the wall in alternating patterns. The result is a cleaning and pulsing process causing the liquid/solid content to move in and out of contact with the wall. Air to the system is supplied by a compressor or other means. The outer hub (common air supply) is fabricated in ringed cells starting at the bottom and are evenly spaced to the top of the hub. These cells maintain a specified PSI due to inlet and outlet check valves. Ball valves can regulate the amount of air passed to and through each cell. Liquid exiting the membrane wall will free fall into the center between the wall and hub and exit the system. The discharging of liquid can continue in series to obtain the desired thickening of solids.

The benefits achieved by the sludge thickener include: that this extraction process is non-mechanical; that the inline pneumatic dewatering tube will not clog; and the inline thickening process.

The invention also includes the novel polymer mixing-feeding device of the invention.

The invention further includes the mixing-flocculating system of the invention. Such apparatus for mixing and flocculating fluids containing suspended solids includes conduit means for conducting the fluid to an outlet in the conduit means, a vertical drop section in the conduit means, a horizontal section in the conduit means extending from the vertical drop section, a vertical rise section in the conduit means extending from the horizontal section, a horizontal recycle section in said conduit means extending from said vertical rise section to said vertical drop section. A movable, nonflexible baffle plate is pivotally mounted on one end in the vertical drop section at or near the top portion of the intersection between the vertical drop section and the horizontal recycle section. The pivotal, movable baffle plate is adopted to constrict in a variable manner, at such location, the internal diameter of the vertical drop section. A set of at least one nonflexible baffle located on the bottom internal surface of and a set of at least one nonflexible baffle located on the top internal surface of the horizontal section. The sets of nonflexible baffles are positioned in relation to each other so as to be in alternating sequence. Preferably at least one nonflexible baffle is located on the top internal surface of the horizontal recycle section. Preferably a nonflexible baffle is located on the internal wall of the vertical rise section opposite of the horizontal recycle section so as to be at or near the lower portion of the intersection of the vertical rise section and the horizontal recycle section. Preferably a nonflexible baffle is located on the internal wall of the vertical drop section opposite of and below the intersection of the vertical drop section.

Also preferably means for introducing a floc producing agent into the fluid or liquid in the conduit means upstream of the vertical drop section. Preferably the means introducing a floc-producing agent comprises a plurality of injector jets spaced around the periphery of the conduit means upstream from the vertical drop section.

The invention also includes a combination of the mixing flocculating device of the invention mounted on the bed of a truck or on a trailer. A polymer mixing system and a means for adjusting the pH of the sewage are also preferably mounted on the trailer. The polymer mixing system is used for preparing an activated polymer solution and injecting the activated polymer solution into the inflow line of the mixing-flocculating device. A generator can also be mounted on the trailer to provide electrical power to operate the polymer mixing system and the means for adjusting the pH of the sewage.

The invention also involves an improved sand cell for the dewatering of sewage composed of water and particulate solids. A grid having open vertical passageways is positioned horizontally in the sand layer in the sand cell. Preferably the grid has a honeycomb or similar shape. Preferably the grid is composed of high density polyethylene plastic.

The invention also includes the pneumatic dewatering (deliquiding) device or tube of the invention.

The pneumatic deliquiding tube, which is adopted for use in the vertical orientation of the central axis of said deliquiding tube, includes a cylindrical shell, a cylindrical tubular filter positioned inside of the cylindrical shell, and two cylindrical blocks, each of which is affixed on the outer portion of one end to an end of the cylindrical shell and on the inner portion to of such end to the corresponding end of the cylindrical shell. The blocks have a central passageway which corresponds to the interior of the cylindrical filter. There is a plurality of passageways in the cylindrical shell which traverse entirely around said cylindrical shell. There are at least two manifold means oriented parallel or at an acute angle to the central axis of the deliquifying tube. The manifolds are located external to the cylindrical shell. Each of the manifolds communicates by means of conduits to every other of the passageways (that is, in an alternative sequence). At least one of the manifolds communicates with passageways other than the passageways with which at least one other manifold communicates. A plurality of air jets is located on the inner wall of the cylindrical wall. Each of the passageways has at least two of the air jets communicating therewith. The manifolds are adopted to be connected to a source of pressurized gas. There is means for controlling the flow of pressurized gas so that the pressurized gas is delivered in short phases or bursts in a manner alternating between the manifolds which communicate with different alternative arrays of the passageways. The pressurized air exits from the air jets against the external surface of the cylindrical filter in the alternating manner. At least one channel is in at least one of the blocks. Such channel communicate from the space between the cylindrical shell and the cylindrical shell to the exterior. The pneumatic deliquiding tank can be constructed so that the cylindrical shell and the cylindrical filter is segmented with one of the blocks between each of the segments—see FIG. 12.

The sludge thickener has the ability to dewater (deliquid) any solution containing solids. The device extracts liquid from a liquid/solid by passing the liquid/solid through a screen causing liquid discharge. The screen is constantly cleaned by air injection.

Modifications and changes made to this sludge treatment process can be effected without departing from the scope or spirit of the present invention. For example, a sand-cell media (grid) in which the shape of the individual cells does not result in a honeycomb formation may be used. Also, the embodiments of this sludge treatment process which are illustrated as follows have been shown only by way of example and should not be taken to limit the scope of the following claims.

DETAILED DESCRIPTION OF THE INVENTION

Figure 1:
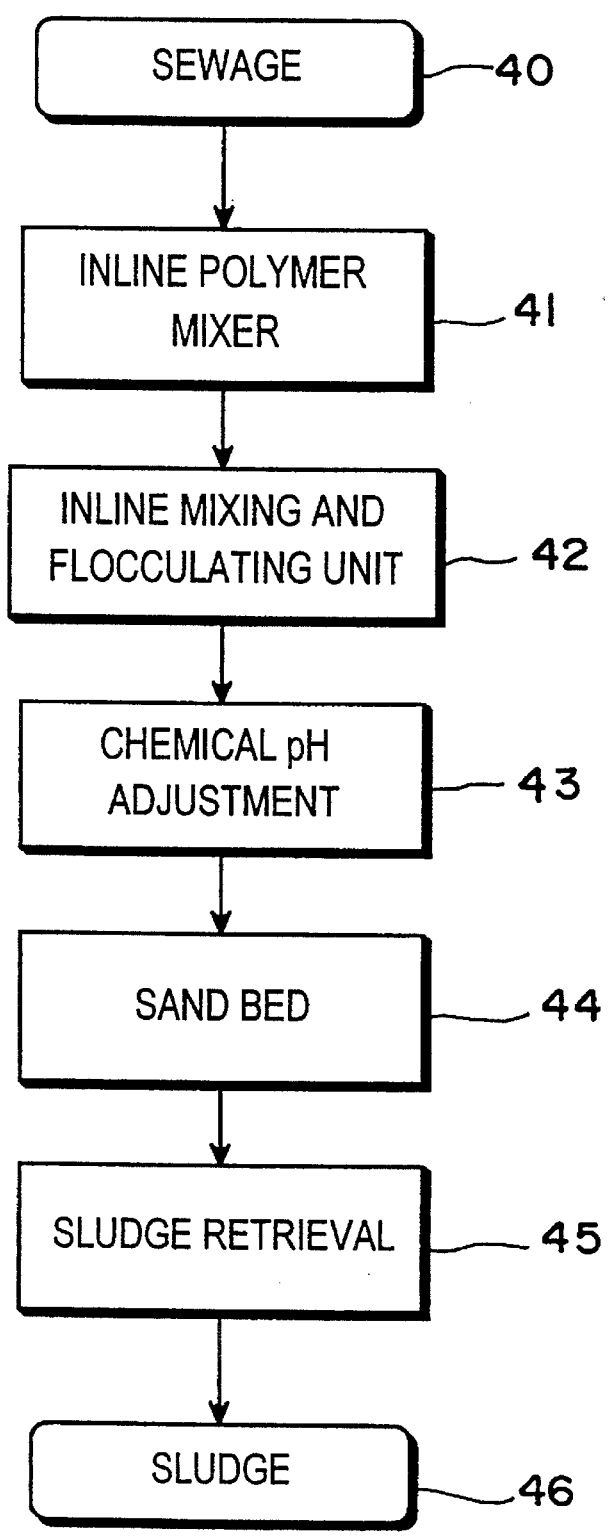
FIG. 1 is a schematic diagram of the steps or stages in the invention process/method.

FIG. 1 describes the five step/stage process of the invention described in FIG. 1. Sewage 40 is obtained from a primary sewage treatment system which is or includes a filtering step to remove large objects, grit and the like and a sedimentation tank step to remove suspended settleable solids. Activated polymer solution from inline polymer mixer 41 is injected into sewage 40 to aid in flocculation. The sewage 40 then moves into inline mixing-and-flocculating unit 42 wherein the sewage is mixed and flocculated to enhance chemically induced liquid-solids separation. The treated sewage exiting from mixing-and-flocculating unit 42 is subjected to chemical pH adjustment 43 by the addition thereto by a base such as lime or caustic (potassium hydroxide or sodium hydroxide). The pH of the sewage is adjusted into the basic pH range or to a higher basic pH. The sewage is then poured onto sand bed 44 which contains a support grid therein. The larger insoluble solids and flocks in the sewage collect on the top of sand bed 44 and the water in the sewage passes/filters through sand bed 44. Once the solids and flocks located on top of sand bed 44 dry, a layer of dried sludge pieces is obtained on top of sand bed 44. The dried sludge pieces are then removed in sludge retrieval step 45 to provide dried sludge 46.

Figure 2:
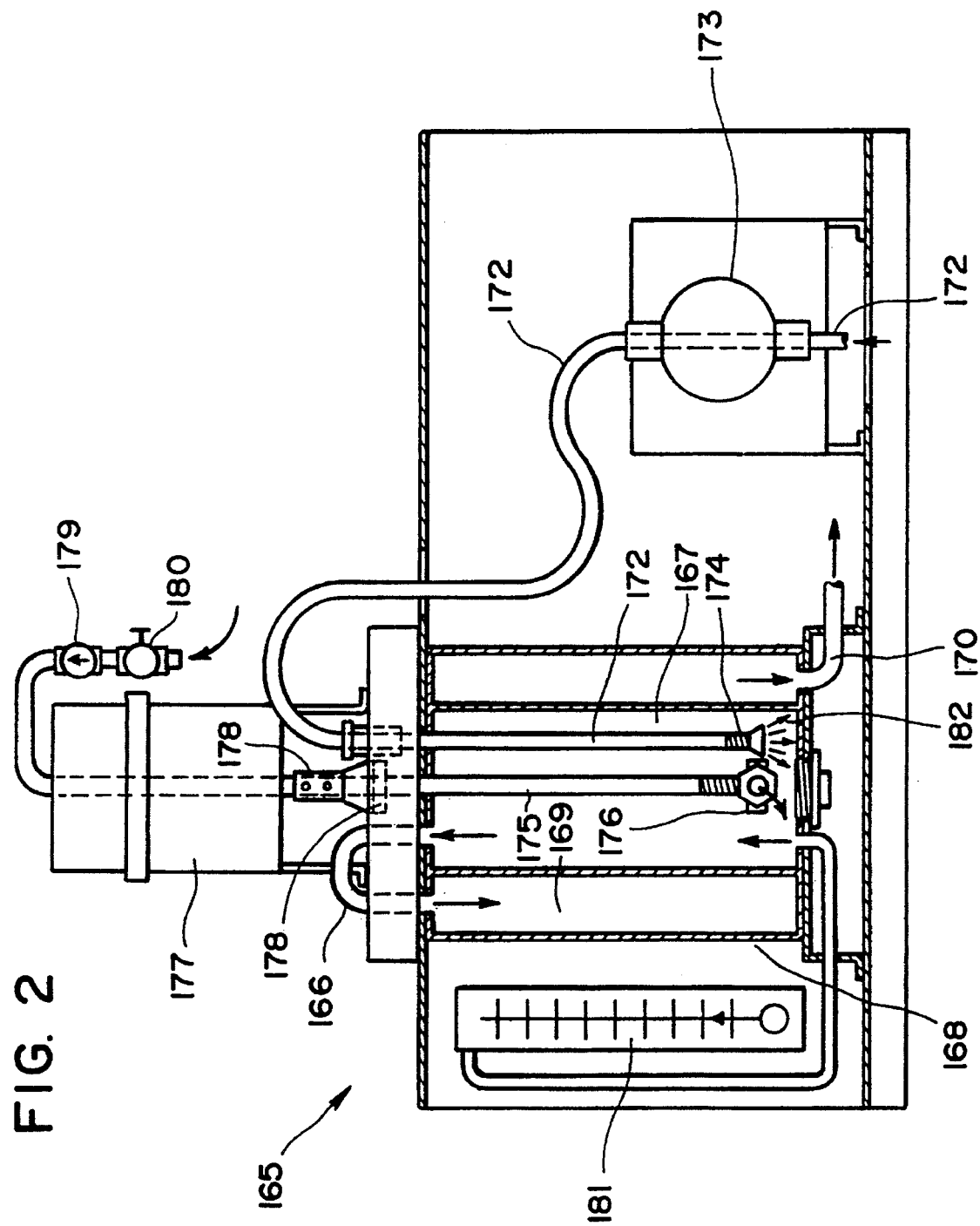
FIG. 2 is a side, elevational view, partially cut-away, of the polymer mixing-feeding device of the invention.
Figure 3:
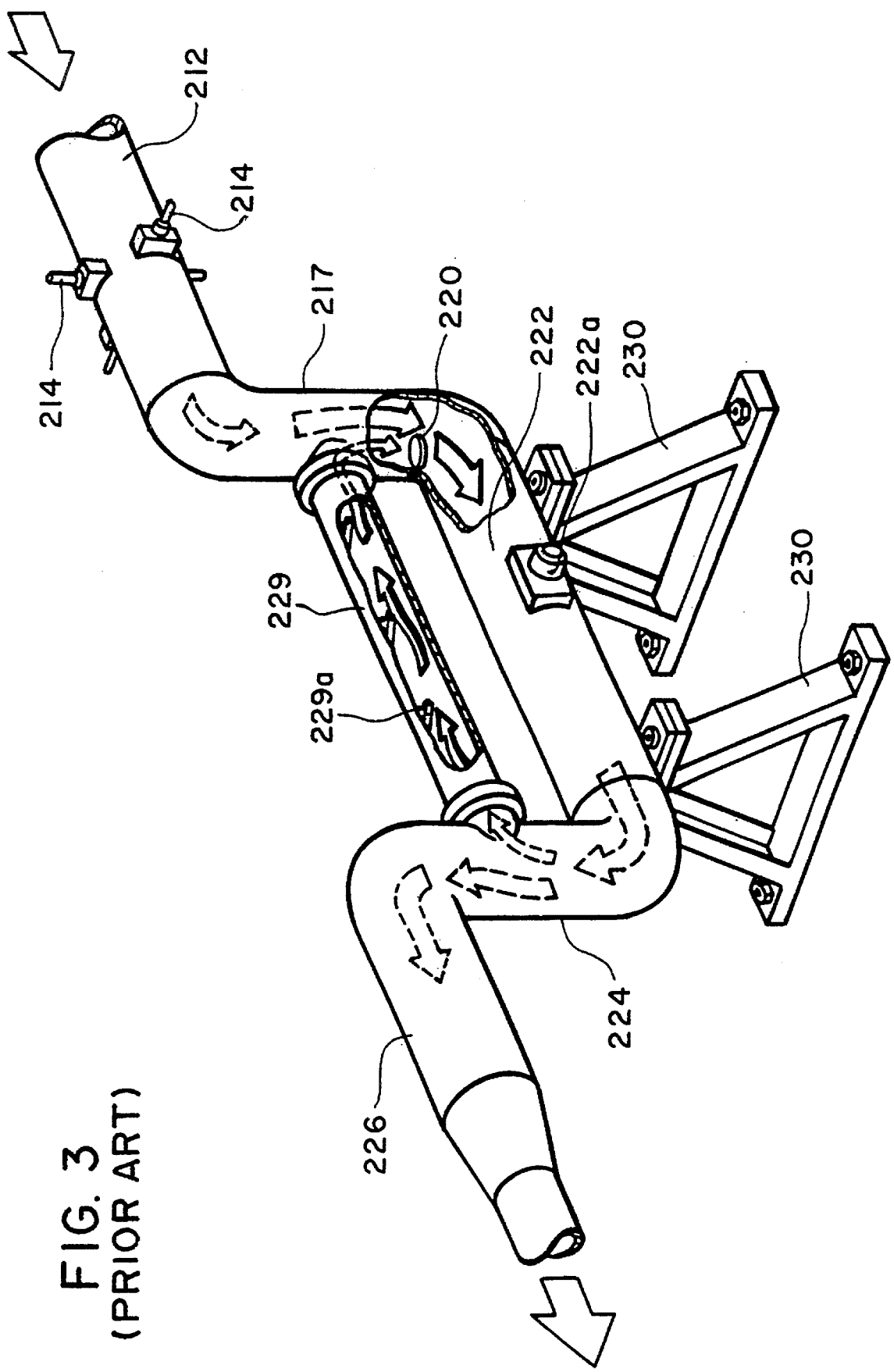
FIG. 3 is a perspective view, partially cut-away, of the apparatus for flocculating fluids containing solids, along with polymer injectors, of U.S. Pat. No. 5,248,416.
Figure 6:
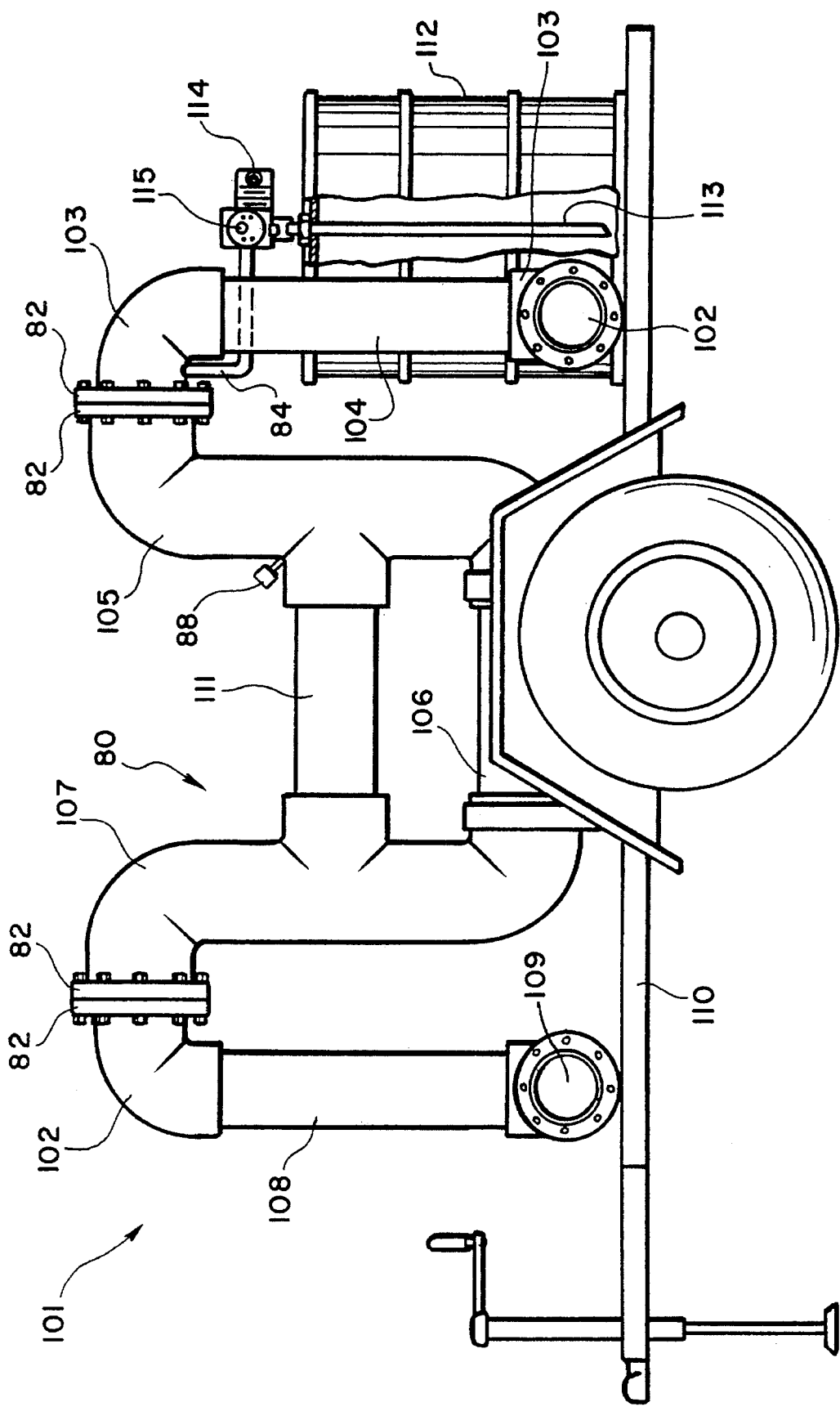
FIG. 6 is a side, elevational view of the mixing-flocculating system on a trailer including a barrel, a dip tube, a motor and a control valve.
Figure 7:
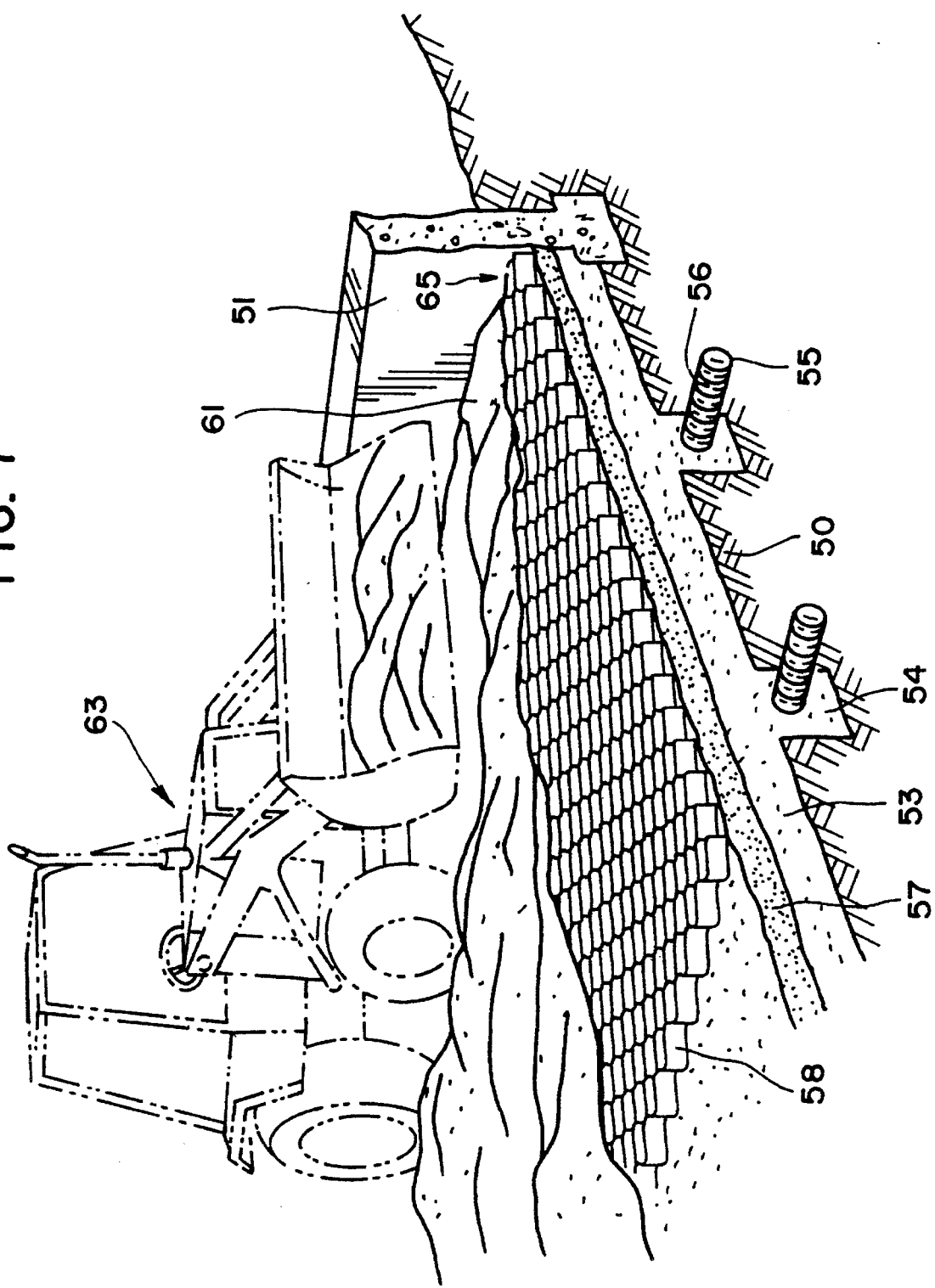
FIG. 7 is a perspective view of a vertical cross-section of the sand filter set-up of the invention including a layer of sand, a sand-cell media in the sand layer, a porous (stones or pebbles) layer, non-porous pipes having holes therein and a non-porous bottom layer.
Figure 8:
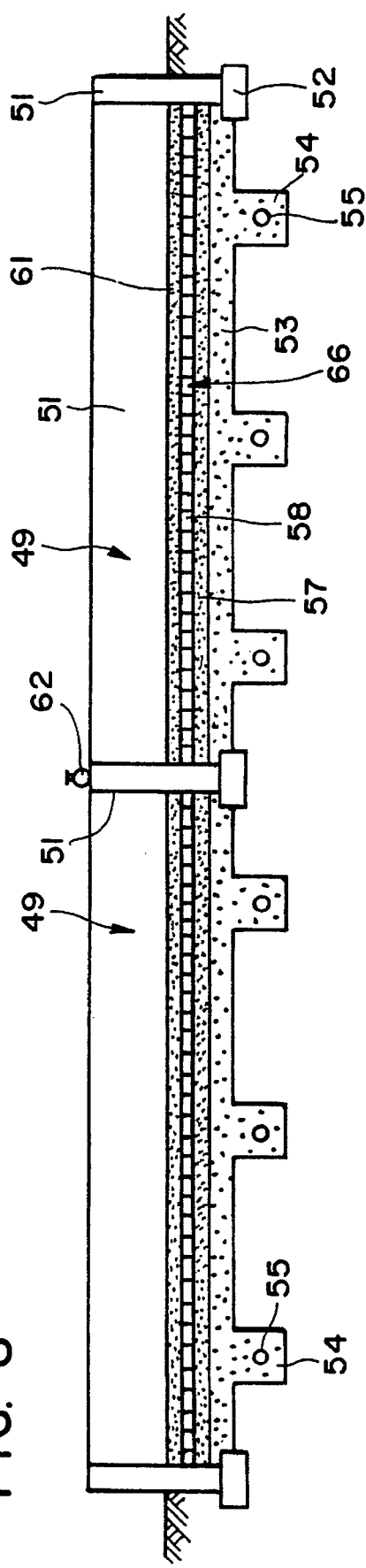
FIG. 8 is a perspective view of a vertical cross-section of the sand filter set-up of the invention shown in FIG. 7; having holes and a non-porous layer.
Figure 9:
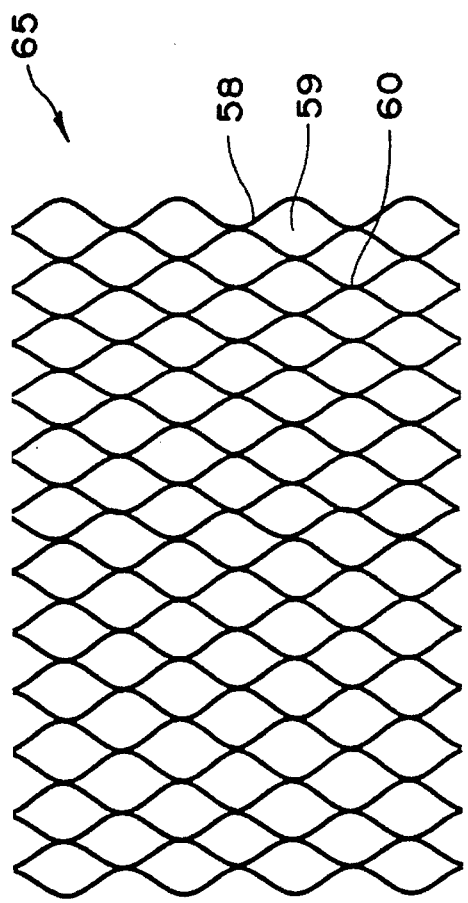
FIG. 9 is an elevational view of the sand-cell media having a honeycomb formation.
Figure 10:
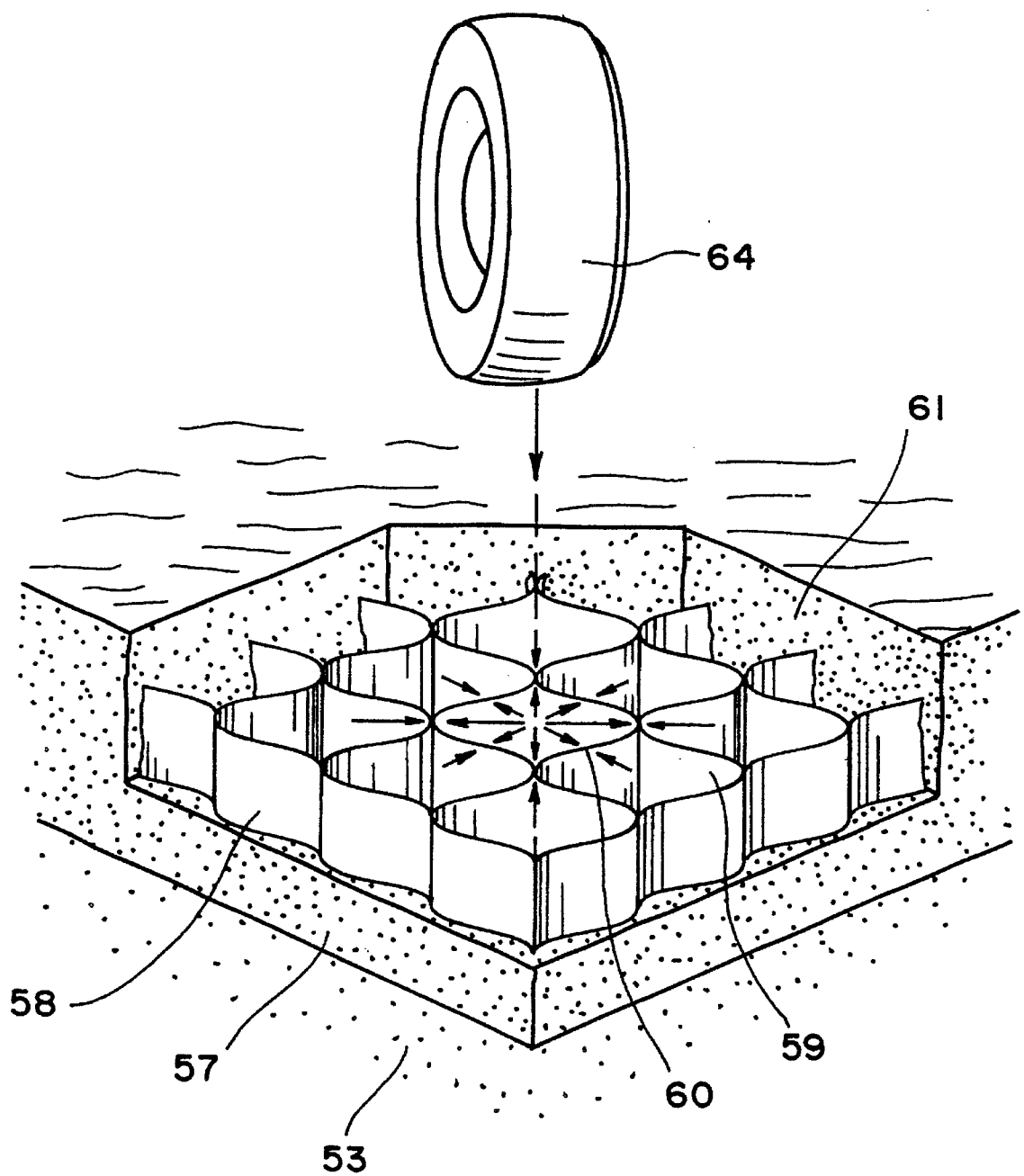
FIG. 10 is an elevational view of the sand-cell media (in honeycomb formation) and surrounding sand layer showing the forces impacting the sides of a single sand-cell when the wheel of a loader or other loading equipment is on the sand surface above it.

With regard to the first step of the invention process, that is, polymer mixing and injecting device (see FIG. 1) is more fully shown in FIG. 2. The polymer mixing-feeding (injecting) (165) system is an integrated equipment package which automatically meters, activates, dilutes and feeds liquid polymer and water. (See FIGS. 2 and 6.) Concentrated polymer and water are blended in a complete high energy chamber.

The prepared solution via tube (166) exits the original chamber (167) through the top of the vessel (168). It then re-enters an outer retention chamber (169) and exits the chamber (169) via tube (170) at the bottom of the vessel to the polymer injectors. A round access plate (171) is fabricated in the bottom of the primary chamber (167) for repair and service. The chamber (167) can be constructed of polyvinyl chlorides, stainless steel or any other suitable material. Polymer from a source not shown is transported in tube (172) by means of metering pump (173). Unit (173) mixes water with the polymer. The polymer is injected into the chamber (167) through a tube (172) passed through the top of the chamber (167). The tube (172) is designed to be adjustable in length giving variations in depth or placing the polymer closer to the aspirator or mixing energy. At the end of the tube (172), a spring loaded check valve (174) allows polymer to spray into the mixing area in a thin filming process (182). Energy for polymer activation is created by a ⅝ inch or any size stainless steel hollow shaft (175) which at the end of the shaft is a polyvinyl chloride or stainless steel 4-way aspirator (176). With the aspirator turning at 3,450 rpm, a tremendous vacuum occurs drawing free air down the hollow shaft (175) into the chamber (167). This process causes high energy mixing. The stainless steel shaft (175) is driven by a hollow core motor (177). The motor (177) and shaft (175) are attached by a coupler (176). The ⅝ inch or any size shaft (177) with aspirator (176) is placed inside the chamber (176) and that chamber (176) is made water tight with exterior mechanical seals (178). Inline check (179) and ball valves (180) are installed on the top or inlet side of the motor (177). These valves (180) can regulate the amount of air passed through the hollow shaft (175) to the mixing chamber (176). The one way directional flow check valve (179) is used to prevent liquid from exiting through the aspirator (176) and shaft (175) when the motor (177) is in the off position. The mixer has a brass solenoid valve for on/off control of dilution water supply (not shown), and a rotameter-type flow indicator (181) equipped with integral rate-adjusting valve. Water is supplied to primary chamber (167) via tube (183). The flow indicator is machined acrylic and has valve stop and guided float. Water flow rate is adjustable 0 to 500 USGPH. Water supply input and stock solution output fittings are 0 to 500 FNPT. The drive motor (177) of the unit is powered by a 2500 watt generator producing 12OV-15 amps. The generator (not shown) is mounted to the trailer and becomes a permanent fixture of the transportable system.

Figure 4:
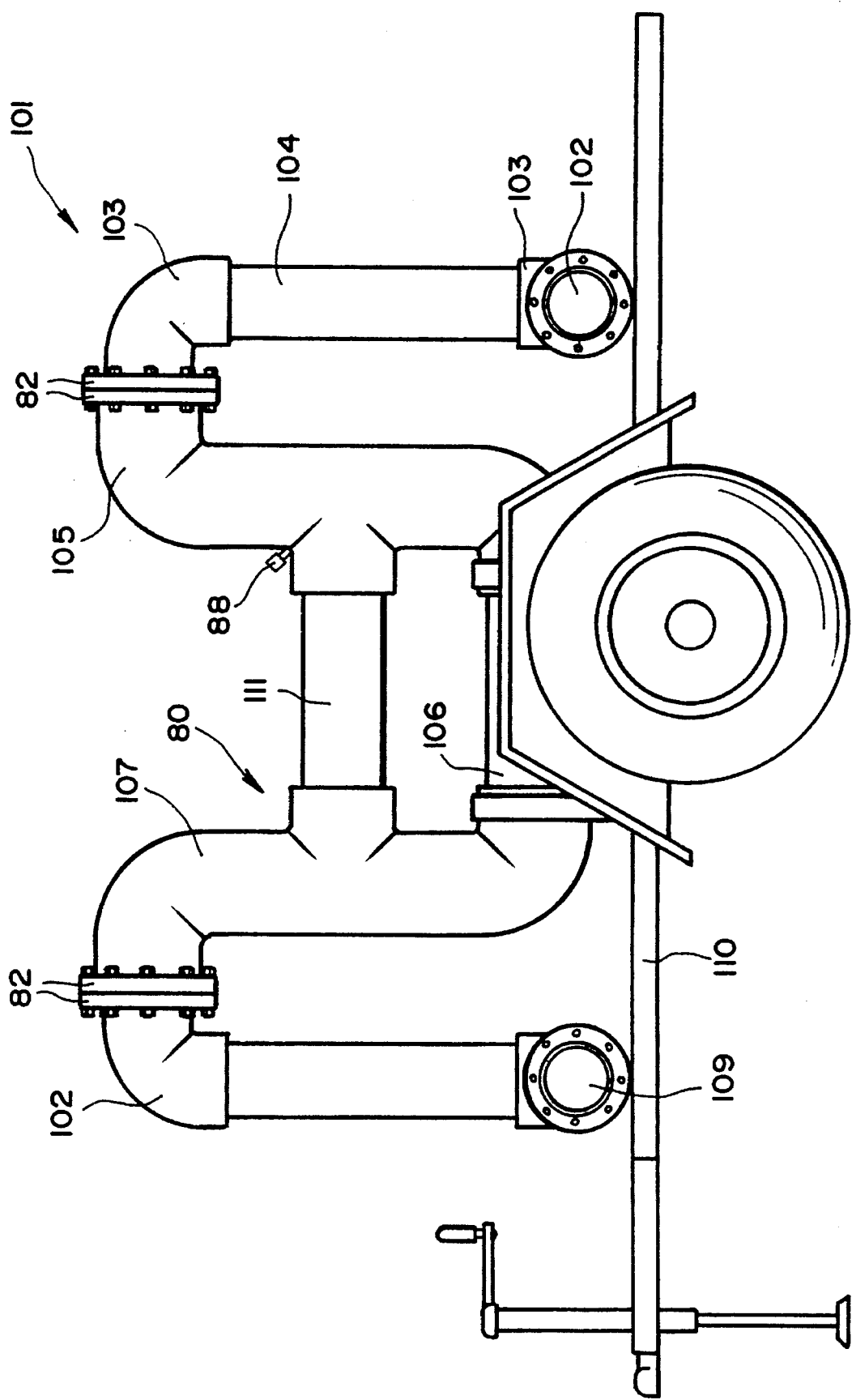
FIG. 4 is a side elevational view of the mixing-flocculating system on a trailer.

With regard to the second step of the invention process, that is, inline mixing and flocculating (see FIG. 1), the following mixer-flocculating system is constructed: Onto the bed of a trailer (110), the mixer-flocculating system (101) is secured. (See FIG. 4.) Part of the mixer-flocculating system is a mixer-flocculator unit (80). Sewage enters pipe (102) the mixing-flocculator unit (80) through an elbow (103). The elbow (103) is attached to a vertical inlet pipe segment (104) which is, in turn, attached to another elbow (103). This latter elbow (103) has a flange (82) which is attached to a flange on the end of a downflow segment (105). The downflow segment (105) continues into a horizontal bottomflow segment (106). A recycle segment (111) contacts the downflow segment (105). An electrical control-drive unit (88) turns a threadedly adjustable rod (88a) extending through the wall of the device to contact the top of adjustable baffleplate (87). Baffleplate (87) is pivotally attached (87a) to the side of to the downflow segment (105) near the top where the downflow segment (105) and recycle segment (111) intersect. The adjustable, nonflexible baffleplate (87) is located at an angle (which can be readily changed) within the downflow segment (105). (See FIG. 5.) The electrical control-drive unit (88) can, instead, be a manual control (of the angle of the adjustable baffleplate), such as, manually turning the rod (88a). The other end of the recycle segment (111) and the other end of the bottomflow segment (106) are joined to openings in a upflow segment (107). At one end of the upflow segment (107) is a flange (82) which is attached to a flange (82a) at one end of an elbow (103). The other end of this elbow (103) is attached to a vertical, exit pipe segment (108). Attached to the other end of the vertical, exit pipe segment (108) is another elbow (103) through which the sewage exits (109).

Figure 13:
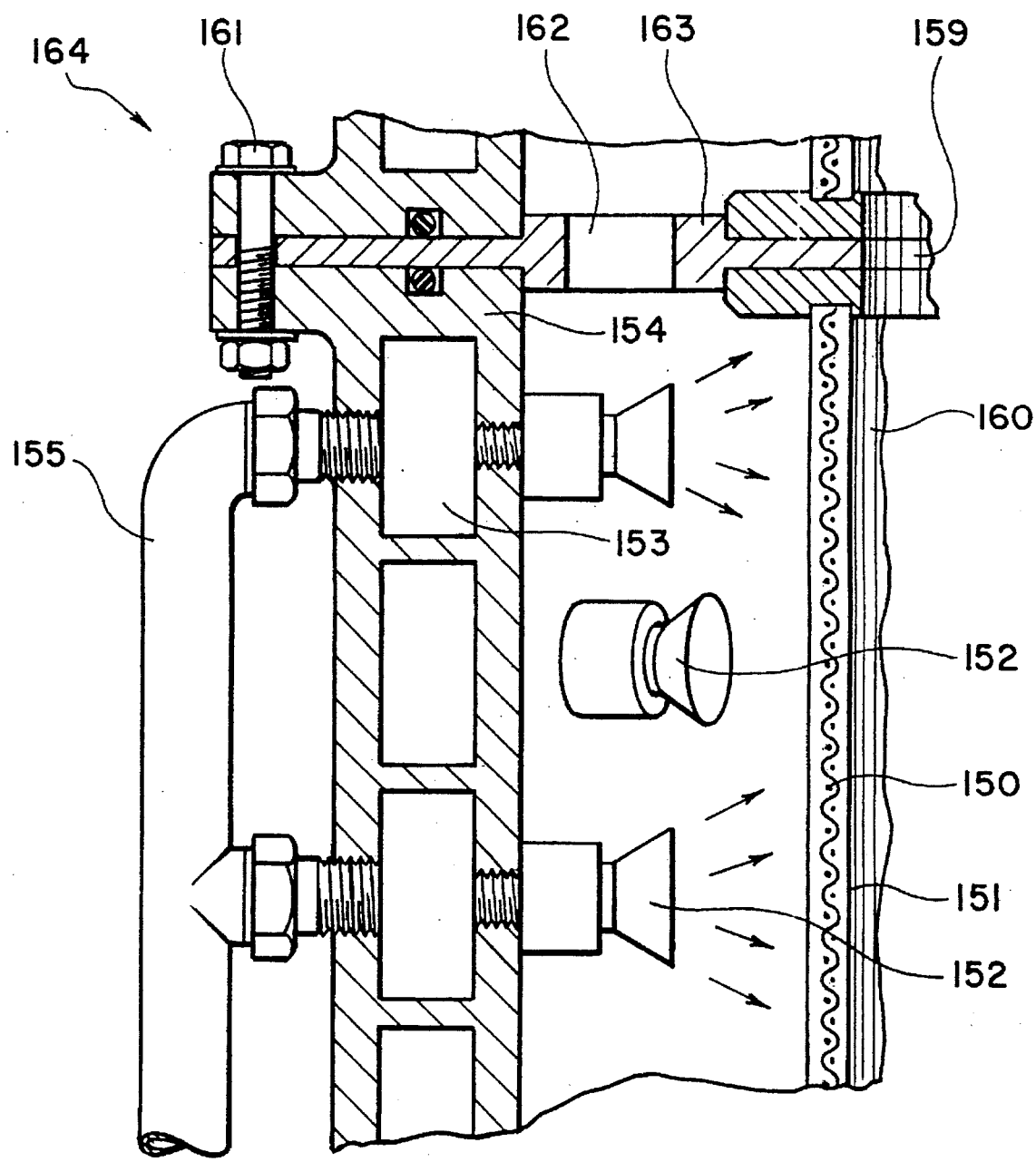
FIG. 13 is a longitudinal, partial cross-sectional view of another embodiment of the pneumatic dewatering device of the invention.

Running into the elbow (103) which is attached both to the vertical inlet pipe segment (104) and the downflow segment (105) are polymer or flocculant injection lines (84). Attached to the other end of these polymer or flocculant injection lines (84) are a manifold (85), a quick connect (86), a motor (115) and a control valve (114). (See FIG. 6.) A dip tube (113) runs from the control valve (114) into a barrel (112) resting on the trailer (110). Preferably the polymer mixing and injecting apparatus of FIG. 13 is used to provide the activated polymer solution to barrel 112.

Sewage enters an elbow (103) and runs through the vertical inlet pipe segment (104). It then passes through another elbow (103) into the downflow segment (105). As the sewage/flow passes into the downflow segment (105), it passes through a 45 degree angle. This area is called mixing zone 1 (83). As the sewage/flow runs through the downflow segment (105), it encounters an adjustable baffleplate (87), which is positioned at an angle. The adjustable baffleplate (87) restricts the vessel's flow by about 50 to about 80 percent, thus increasing the original flow velocity by as much as 600 percent. Then, the sewage/flow is fanned in one direction—towards the bottomflow segment (106). A fixed baffle (90), which restricts typically 40 percent of the vessel's size, is positioned in the downflow segment and serves to oppositely direct and fan the passing sewage/flow. The area between the adjustable baffleplate and the fixed baffle is called mixing zone 2 (89). Then, the sewage/flow is directed into a 45 degree round angle into the bottomflow segment (106). Positioned within the bottomflow segment are at least two (preferably, a number of) fixed, horizontal baffles (92), the positioning of which cause the sewage/flow to pass under and over and under these fixed, horizontal baffles (92) in a serpentine flow pattern, thereby reducing the flow velocity. This area is called mixing zone 3 (93). The sewage/flow, then, enters the upflow segment (107) in a 45 degree round angle which causes the sewage/flow to move in a spiraling pattern. Positioned in the upflow segment (107) is (at least one) fixed vertical baffle (96). Mixing zone 5 is in the exit end of upflow pipe 107 where it bends to the horizontal. Before the sewage/flow exits the mixer-flocculator unit (80), before it enters an elbow (103) and the vertical exit pipe segment (108), it passes a horizontal pipe/recycle segment (111) which causes a portion of the sewage/flow to divert through this line, because of the pressure drop caused by the adjustable inlet baffle (87) placed at an angle. The bypass velocity may be increased, if the size of the pipe is increased and with baffle adjustments. Also before the sewage/flow exits the mixer-flocculator unit (80), before it enters an elbow (103) and the vertical exit pipe segment (108), but after it passes the horizontal pipe/recycle segment (111), it passes through a 45 degree angle. This area is called mixing zone 4 (99). Recycle segment (111) has a smaller diameter than the rest of the pipes of the unit.

A drainage plug (91) is present in the downflow segment (105), close to where the sewage/flow enters the bottomflow segment (106). A flush plug (95) is present in the upflow segment (107) close to where it joins together with the bottomflow segment (106).

Figure 5:
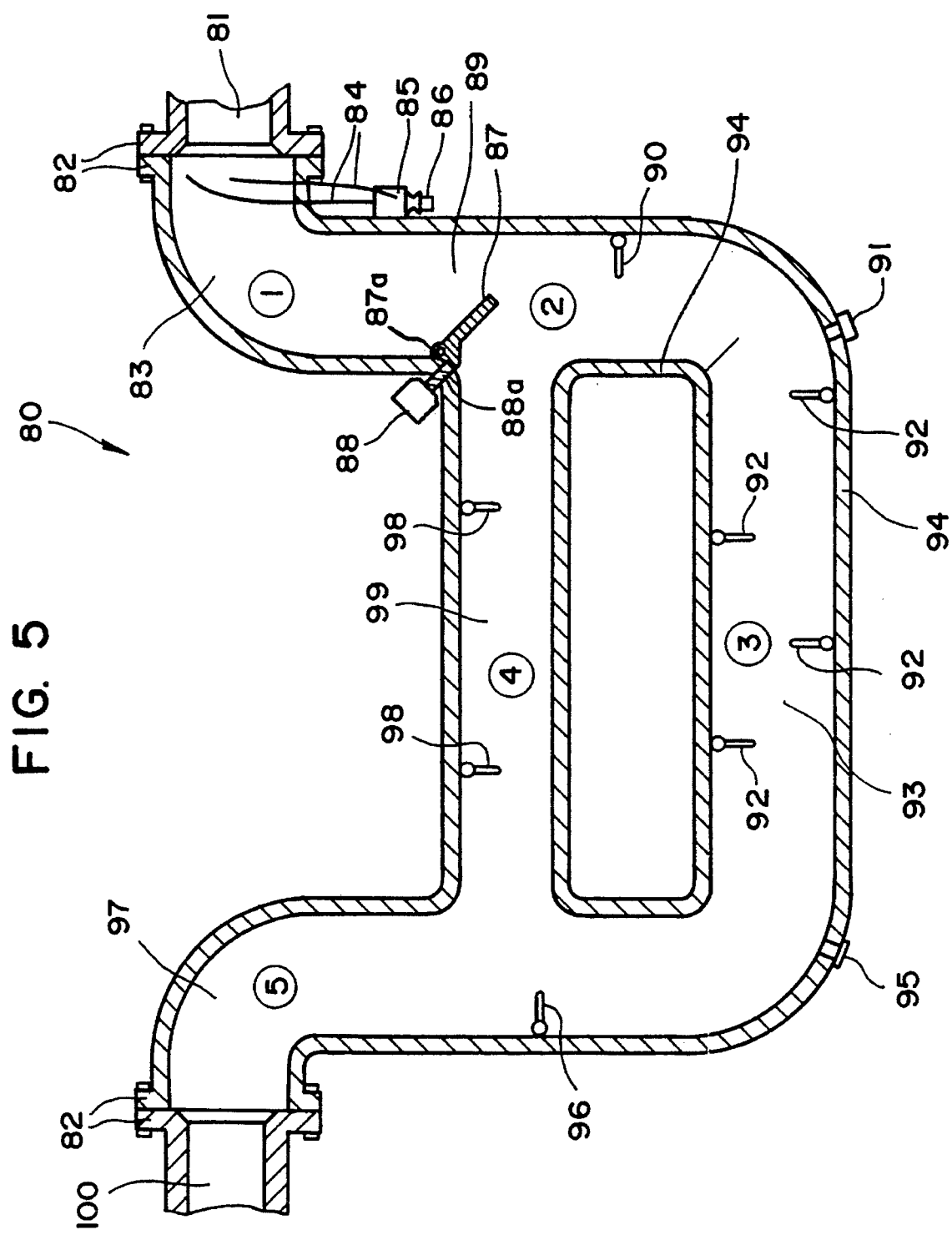
FIG. 5 is a side, cross-sectional view of the mixing-flocculating unit.

Model RF6 of the mixing and flocculating unit 80 os basically shown in FIG. 5. Note the two non-flexible baffles 92 located in the bottom of bottomflow segment 106. The results of tests using Model RF6 in dewatering test are given below in Table 1 and 2.

TABLE 1

| | MIXING ZONES (Velocity versus feet per second) | | | | |
|---|---|---|---|---|---|
| G.P.M. | ZONE 1 | ZONE 2 | ZONE 3 | ZONE 4 | ZONE 5 |
| A) 100 | 1.28 | 5.04 | 2.89 | 8.68 | 1.28 |
| B) 150 | 1.92 | 7.56 | 3.83 | 13.10 | 1.92 |
| C) 200 | 2.57 | 10.10 | 4.44 | 17.4 | 2.57 |

TABLE 2

|   | Velocity (G.P.M.) | Sludge Con. (% T.S.) | Emulsion Polymer Conc. (Neat) | Polymer Solution Conc. (%) | Baffle Plate Position (% of Vessel Dia) | Floc Size (SML) | Filtrate Conc. (% T.S.) | Dried Sludge (% and Time) |
|---|---|---|---|---|---|---|---|---|
| A) | 100 | 2% | 55% | .25 | .70 | L | 0 | 6 hrs.-14% |
|   |   |   |   |   |   |   |   | 24 hrs.-24% |
|   |   |   |   |   |   |   |   | 48 hrs.-30% |
|   |   |   |   |   |   |   |   | 72 hrs.-47% |
|   |   |   |   |   |   |   |   | 168 hrs.-60% |
| B) | 150 | 2% | 55% | .25 | .65 | L | 0 | same |
| C) | 200 | 2% | 55% | .25 | .60 | M | 0 | same |

Model RF8 is similar to Model RF6 except it has a larger flow capacity and only has one nonflexible baffle 92 in the bottom of flow segment 106 (located between the two baffles 92 in the top thereof). The results of tests using Model RF8 in dewatering tests are given below in Tables 3 and 4.

TABLE 3

MIXING ZONES
(Velocity versus feet per second)

|   | G.P.M. | ZONE 1 | ZONE 2 | ZONE 3 | ZONE 4 | ZONE 5 |
|---|---|---|---|---|---|---|
| A) | 200 | 1.28 | 5.04 | 2.89 | 8.68 | 1.28 |
| B) | 300 | 1.92 | 7.56 | 3.83 | 13.10 | 1.92 |
| C) | 400 | 2.57 | 10.10 | 4.44 | 17.4 | 2.57 |
| D) | 500 | 3.31 | 12.60 | 5.55 | 21.7 | 3.21 |
| E) | 600 | 3.85 | 15.10 | 6.66 | 28.0 | 3.85 |
| F) | 700 | 4.49 | 17.60 | 7.77 | 30.4 | 4.49 |

TABLE 4

|   | Velocity (G.P.M.) | Sludge Con. (% T.S.) | Emulsion Polymer Conc. (Neat) | Polymer Solution Conc. (%) | Baffle Plate Position (% of Vessel Dia) | Floc Size (SML) | Filtrate Conc. (% T.S.) | Dried Sludge (% and Time) |
|---|---|---|---|---|---|---|---|---|
| A) | 200 | 2% | 55% | .25 | .70 | L | 0 | 6 hrs.-12% |
|   |   |   |   |   |   |   |   | 24 hrs.-22% |
|   |   |   |   |   |   |   |   | 48 hrs.-35% |
|   |   |   |   |   |   |   |   | 72 hrs.-45% |
|   |   |   |   |   |   |   |   | 168 hrs.-65% |
| B) | 300 | 2% | 55% | 25 | .65 | L | 0 | same |
| C) | 400 | 2% | 55% | .25 | .60 | M | 0 | same |
| D) | 500 | 2% | 55% | .30 | .55 | S | 0 | same |
| E) | 600 | 2% | 55% | .50 | .50 | S | 0 | same |
| F) | 700 | 2% | 55% | .55 | .50 | S | 0 | same |

The sewage apparatus of U.S. Pat. No. 5,248,416 (Howard) is shown in FIG. 1. In the apparatus of Howard, incoming liquid containing solids and recirculated liquid containing solids and flock fills the entire apparatus, including pipe 229. The velocity going into the system is the same as that exiting the system. The path of the flow of material is down conduit 217, through bottom conduit 220, up conduit 224, and then split so as to be partly recycled through the top pie (229) and partly passed on out conduit 224, without any meaningful restrictions. Item 220 is a moveable flutter or ledge and items 229a are fabricated rubber tumblers which bend with the flow and, thus, offer little or no restrictions in the flow paths. Moveable 220 is located in down flow conduit 217 at the lower intersection point of recycle conduit 229 and down flow conduit 217. Through testing of the Howard system, applicant has found that the Howard system is not very effective in achieving its stated purpose and in solving its stated prior art problem.

In contrast, the improvements of the instant invention include a mixer-flocculator unit having an adjustable baffle-plate placed at an angle to the direction of flow of the incoming sewage (containing, for example, ½ to 8 percent of solids). The baffle plate restricts the flow area in downflow pipe segment 106 just before the intersection with recycle pipe segment 111 by about 50 to about 80 percent. This cross-sectional area adjustment process can increase the original flow velocity by as much as 600 percent or more. The pattern of flow of the combination of the incoming material and the recycle material, then, is moved in one direction. Thereafter, flowing liquid is oppositely directed and fanned by a fixed, nonflexible baffle which restricts 40 percent or so of the internal size (cross sectional area) of the pipe. Then, the liquid flow is directed into a 45 degree round angle which causes the liquid flow to turn and pass under and over and under fixed, nonflexible baffles in a serpentine flow pattern, thereby further reducing the velocity of flow in the pipe. Thereafter, the liquid flow enters a 45 degree round angle which causes the flow to move upward in a spiraling pattern. The liquid flow, then, comes in contact with a fixed, nonflexible baffle. Such baffle is located across from the entrance to a side or recycle pipe. As the upward liquid flow reaches such baffle and side horizontal recycle pipe, a portion of it to divert through this line by the action of such baffle and by the pressure drop caused by the adjustable inlet baffle plate in the down flow pipe segment 106. The internal diameter of recycle pipe 111 is less than the internal diameter of down flow pipe 105 or upward flow pipe 107. The bypass velocity in the recycle pipe can be increased by decreasing the size of the pipe and/or by adjusting the baffle. This recycle system allows the continued size growth of the floc.

Preferably the mixer-flocculator unit will have multiple injector ports at the influent end of the mixer, through which the activated polymer solution can be injected into the liquid-sludge slurry flow stream. The activated polymer and sludge will then be quickly but gently mixed by baffling energy dispersing action. The mixing action promotes large floc growth. A portion of the flocculated sludge, then, is re-circulated into the influent stream by a pressure drop zone to advance and increase the efficiency of the mixing-flocculating process. The device can be fabricated utilizing corrosion free polyvinyl chloride components, stainless steel, concrete, fiberglass, wood or any other suitable metal or other material. The interior baffles can be fabricated from polyvinyl chloride, stainless steel, concrete, fiberglass, wood or any other suitable metal or other material.

With regard to the third step of the inventive process, that is, a chemical induced pH adjustment of the sewage exiting the mixer-flocculating system (101), the following is included: As the liquid/solids content exits the inline mixer-flocculator unit (80), an electronic or gear driven diaphragm pump (not shown) pumps liquid caustic or lime into the discharge line for example, 102, 108, 109, etc.) of the flocculator-mixer unit (80). The pH of the sludge is increased to 12 by the chemical additive (base). The pH of the sludge will remain at 12 for 72 hours, and, during this period of time, the temperature will reach 52° C. and will remain at that temperature for at least 12 hours. At the end of the 72 hour period during which the pH of the sludge is above 12, the sludge can be air dried to achieve a percent solids of greater than 50 percent. The liquid caustic or lime pump is present on the transportable dewatering trailer (110) with the mixer-flocculating system (101) and the polymer feed system and, thus, is easily transported.

With regard to the fourth step of the invention process (see FIG. 1), enclosure 49 contains sand bed 44. Onto a layer of non-porous material (50), e.g., concrete, a layer of porous material (53) is positioned. Porous material (53) is used as a filter media and usually stone, crushed rock, ceramic shapes, slag and plastics of 1 to 6 inches, practically 2 to 4 inches, in size are used. Stones or pebbles are preferred. At least one—usually more than one—projection of porous material (54) extends from the porous layer (53) into the layer of non-porous material (50). Embedded in each projection channels (48) in porous material (54) is at least one non-porous pipe (55) having at least one hole (56) into which liquid can drain. A layer of sand (57) is positioned above the layer of porous material (53). The sand-cell media sections (65) are positioned above this layer of sand (57). Sand is located in passageways 59 in sand cell grid (65). Above each sand-cell media section (65) is placed a layer of sand (61). This layer of sand (61) is usually, though not necessarily, at least six inches in depth.

Walls (51) surround on all four sides of an area having one or more sand-cell media sections (65)—on wall 51 is shorter to allow a front loader or the like into the enclosure. Each surrounding, dividing wall (51) extends upward from one or more footing supports (52) which are positioned, at least partially, in the layer of non-porous material (50). The top of each dividing wall (51) extends above the layer of sand (61) overlaying the sand-cell media section(s). On the top of each dividing wall (51) which runs between two enclosure areas having sand-cell media sections (65) is portable nozzle (62) which is used to pour sewage into the enclosures.

Each sand-cell media section (65) is made up of one or more sand-cells (58) having the same shape and size. Typically, the sand-cell media section is made up of honeycomb-shaped sand-cells (58) which are joined together in a honeycomb formation (i.e., each sand-cell which is not in an outer layer, where it intersects (59) another sand-cell, it intersects three other sand-cells). A channel (59) runs through the interior of each sand-cell.

Sewage is poured through the channel (62) into one or more enclosures 49 for sand beds 44. The liquid permeates the outer sand layer, flows through the sand in the channels (59) in the grid (65) in the centers of the sand-cells, permeates the layer of sand beneath the sand-cell media, and permeates the pebble layer beneath that layer, leaving the collected sludge solids to dry from the sun and air.

Figure 11:
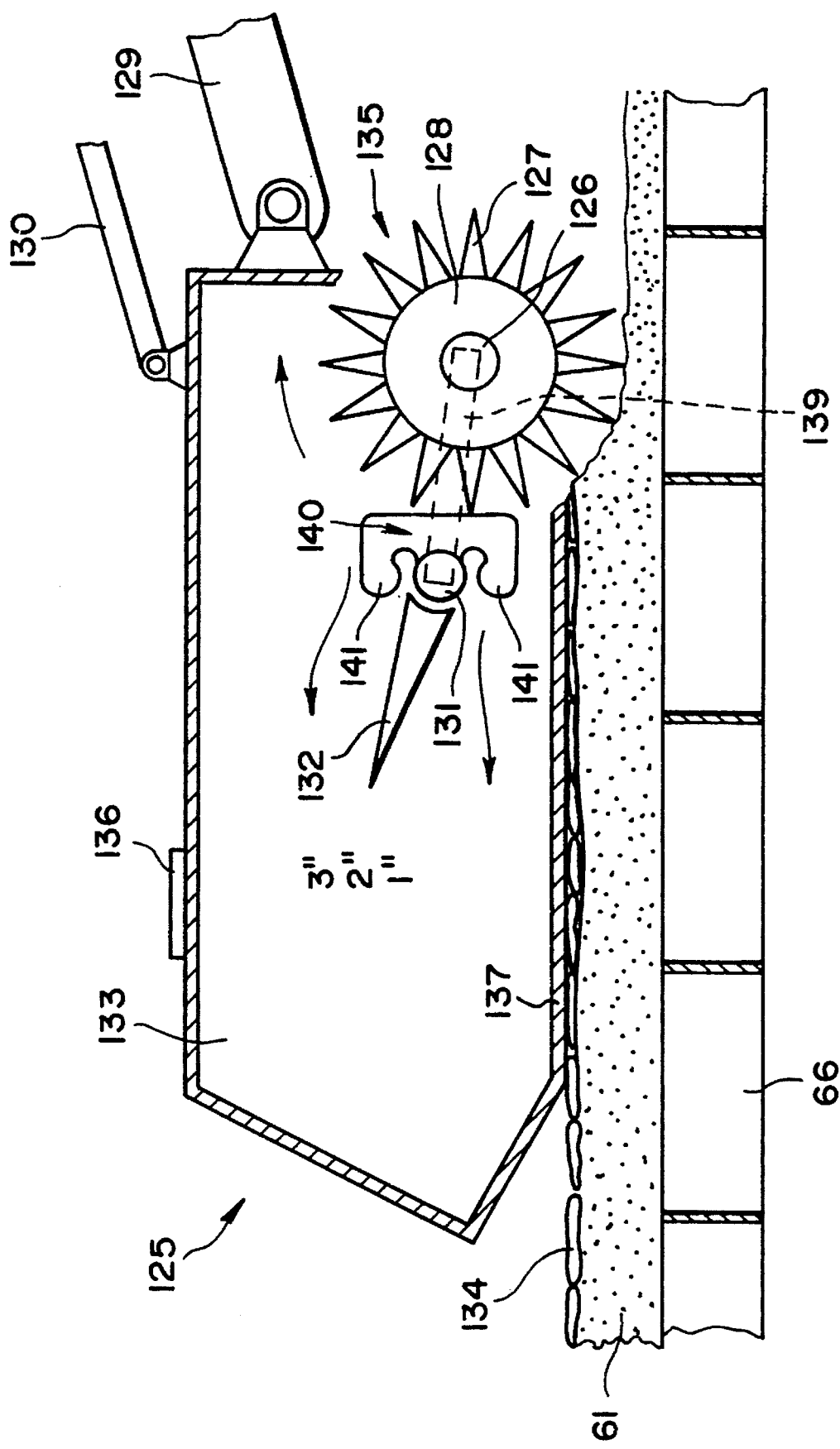
FIG. 11 is a side, elevational view of the sludge retriever operating on top of a sludge drying sand bed which includes sand-cell media.

With regard to the fifth of the invention process (see FIG. 1), a sludge retriever (125) is used to separate the dried sludge layer (134) from the sand (61) in the sand bed (44). (See FIG. 11.) An upper pivoted arm (130) is attached to a front-end loader, as is a lower pivoted arm (129). The other end of each of these pivoted arms is attached to a two cubic yard bucket/hopper (133). The lower side (137) of the bucket/hopper (133) slides along the sandbed slightly above or on the layer of dried sludge (134) being retrieved. The lower, front end (138) of this bucket/hopper (133) is upwardly slanted relative to the rest of the lower end. At the lower back end of the bucket/hopper is attached a rotary drum (135) including a shaft (126) around which a rotary (128), from which multiple raw of three inch tines/teeth (127) project, turns. As the rotary drum (135) turns (clockwise), pieces of dried sludge (134) and minimal amounts of sand (61) are tossed into the bucket/hopper (133). An arm (132) is attached to a ball pivot (131) which has a short arm (139) welded onto the end of ball joint (131). Ball joint (131) is moved up or down in vertical slot (140) in the side of retriever (125) and moved and bolted into one of the three short horizontal slots (141), whereby shaft (126) is moved up or down to the desired position. This arrangement (not shown) is repeated on the other side of the retriever (125). In this manner, the height position of shaft (126) can be adjusted and accordingly the distance that vanes (127) extend below lower side (137) of retriever (125). As typically shown in FIG. 11, vane (127) extension levels of 1 inch, 2 inches and 3 inches are indicated by the marks "1", "2" and "3", respectively. The one inch level is usually used to chop up the dried sludge. The 2 inch level is shown in operation in FIG. 11. The three inch level is used, when the rotation direction of rotary (128) is reversed, to aerate the sand after the dried sludge has been removed. Air flow grill or filter (136) is located in the top surface of bucket (133) near its front.

Figure 12:
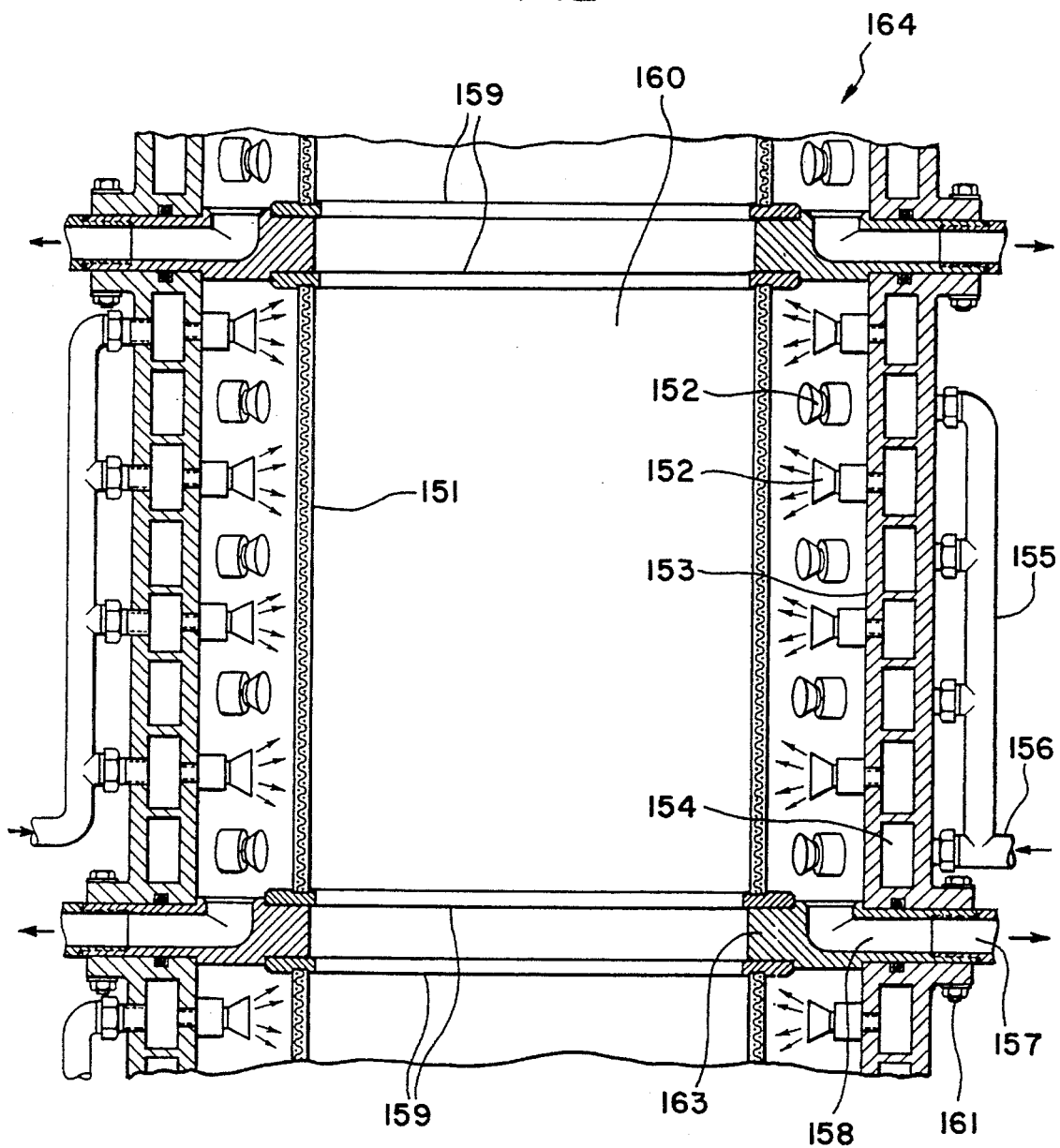
FIG. 12 is a longitudinal, partial cross-sectional view of one embodiment of the pneumatic dewatering device of the invention.

With regard to the optional (sixth) step of the invention, that is, dewatering the sewage using an inline vertically-oriented, pneumatic dewatering tube (164) between steps (a) and (b) or (b) and (c) or (c) and (d), or before step (a), see FIG. 12. A cylindrical-shaped screen filter (150) reinforcing ribs (151), usually composed of stainless steel. Rim rings (159) connect the circular-shaped screen filter (150) with a rim block (163). Running through the rim (163) are water exit passageways (158). The flanged ends of cylindrical shell (153) are bolted (161) together with rim block (163). In this shell (153) are peripheral air chambers (154) which traverse the entire circumference of shell (153). One end of the water exit passageways (158) opens into the area in between the shell (153) and filter (151). Positioned in this area are staggered, pressurized air jets (152) communicating with air chambers (154). Manifolds (155) are positioned outside of shell (153) and communicate with every other circular air chamber (154), and hence to every other bank of pressurized air jets (152).

Use of the pneumatic dewatering device or tube (164) involves conducting (160) the sewage into the central tube-shaped filter where solids in the sewage are caught on the filter (150) and part of the water in the sewage passes through the filter (150). Air under pressure is blown from staggered, high pressure air jets (152) against the outer surface of the filter (150) to dislodge the solids collected on the inner surface of the filter (150). The blowing air jets (152) are alternated in on-off sequences in order to continuously provide regions of the filter for the water to come through unimpeded by blowing pressurized air.

In an alternate form of the invention (see FIG. 13, as opposed to that which is portrayed in FIG. 12), there is not a liquid exit passageway (158) running through each rim (163) through which liquid sewage is dispelled (157). Rather, there is a channel (162) for sewage to flow through the rim (163) from one section to another and then out the bottom.

LIST OF PARTS NUMBERS

In connection with the figures, the following list of the names of the parts of the instant invention are noted:

| Numbers | Parts, Etc. |
|---|---|
| 40 | sewage; |
| 41 | inline polymer mixer; |
| 42 | inline mixing and flocculating unit; |
| 43 | chemical pH adjustment; |
| 44 | sand bed; |
| 45 | sludge retrieval; |
| 46 | sludge; |
| 48 | channels; |
| 49 | sand bed enclosures; |
| 50 | non-porous layer; |
| 51 | dividing wall; |
| 52 | support upon which dividing wall is positioned; |
| 53 | porous layer positioned directly above non-porous layer (50); |
| 54 | projection of porous layer (54); |
| 55 | non-porous pipe; |
| 56 | hole in non-porous pipe (56); |
| 57 | layer of sand underlaying sand-cell media section; |
| 58 | single sand-cell; |
| 59 | channel running through interior of single sand-cell; |
| 60 | point of intersection of 4 individual sand-cells; |
| 61 | layer of sand overlaying sand-cell media section; |
| 62 | channel into which sludge is poured |
| 63 | loader or other loading equipment; |
| 64 | wheel of loader or other loading equipment; |
| 65 | sand-cell media section; |
| 80 | mixer-flocculator unit; |
| 81 | input conduit (influent end of mixer); |
| 82 | flanges; |
| 82a | flange; |
| 83 | mixing zone 1; |
| 84 | polymer or flocculant injection lines; |
| 85 | manifold; |
| 86 | quick connect; |
| 87 | adjustable baffleplate placed at an angle; |
| 87a | pivot attachment; |
| 88 | electrical unit; |
| 88a | threadedly adjustable rod; |
| 89 | mixing zone 2; |
| 90 | fixed, vertical baffle; |
| 91 | drainage plug; |
| 92 | fixed, horizontal baffles; |
| 93 | mixing zone 3; |
| 94 | walls; |
| 95 | flush plug; |
| 96 | fixed, vertical baffle; |
| 97 | mixing zone 5; |
| 98 | recirculation baffles; |
| 99 | mixing zone 4; |
| 100 | output conduit; |
| 101 | mixer-flocculating system; |
| 102 | liquid in; |
| 103 | elbows; |
| 104 | vertical inlet pipe segment; |
| 105 | downflow segment; |
| 106 | bottomflow segment; |
| 107 | upflow segment; |
| 108 | vertical exit pipe segment; |
| 109 | liquid out; |
| 110 | transportable dewatering trailer; |
| 111 | recycle segment; |
| 112 | barrel; |
| 113 | dip tube; |
| 114 | motor; |
| 115 | control valve; |
| 125 | sludge retriever; |
| 126 | shaft; |
| 127 | multiple 3 inch tines/teeth; |
| 128 | rotary; |
| 129 | lower pivoted arm attaching sludge retriever to front-end loader; |
| 130 | upper pivoted arm attaching sludge retriever to front-end loader; |
| 131 | ball pivot; |
| 132 | arm; |
| 133 | two cubic yard bucket/hopper; |
| 134 | dried sludge; |
| 135 | rotary drum; |
| 136 | air flow grill or filter; |
| 137 | lower side; |
| 138 | front end; |
| 139 | arm; |
| 140 | vertical, slot; |
| 141 | show horizontal slots; |
| 150 | screen filter; |
| 151 | rib; |
| 152 | high pressure air jet; |
| 153 | wall; |
| 154 | circular air chamber; |
| 155 | manifold; |
| 156 | pressurized air in; |
| 157 | liquid sewage out; |
| 158 | liquid exit ring; |
| 159 | rim ring; |
| 160 | passageway for sewage; |
| 161 | bolt; |
| 162 | channel for sewage; |
| 163 | rim; |
| 164 | inline pneumatic dewatering tube; |
| 165 | polymer mixing-feeding system; |
| 166 | tube; |
| 167 | inner chamber; |
| 168 | vessel; |
| 169 | retention chamber; |
| 170 | exit tube; |
| 171 | access plate; |
| 172 | tube; |
| 173 | water-polymer mixing unit; |
| 174 | check valve; |
| 175 | hollow shaft; |
| 176 | aspirator; |
| 177 | motor; |
| 178 | seal; |
| 179 | check valve; |
| 180 | ball valve; |
| 181 | flow indicator; |
| 182 | filming process; and |
| 183 | tube. |

In connection with the figures, the following list of the names of the parts of a prior art invention [U.S. Pat. No. 5,248,416 (Howard)] are noted:

| | |
|---|---|
| 212 | upper right hand conduit/system input; |
| 214 | multiple polymer ejectors; |
| 217 | conduit; |
| 220 | moveable flutter or ledge; |
| 222 | conduit; |

| | |
|---|---|
| 222a | conduit; |
| 224 | conduit; |
| 226 | output conduit/system output; |
| 229 | recirculating conduit; |
| 229a | pivotal flaps on recirculating conduit; and |
| 230 | support bracing. |

What is claimed is:

1. Apparatus for mixing and flocculating fluids containing suspended solids comprising conduit means for conducting said fluid to an outlet in said conduit means, a vertical drop section in said conduit means, a horizontal section in said conduit means extending from said vertical drop section, a vertical rise section in said conduit means extending from said horizontal section, a horizontal recycle section in said conduit means extending from said vertical rise section to said vertical drop section, a movable, nonflexible baffle plate pivotally mounted on one end in said vertical drop section at or near the top portion of the intersection between said vertical drop section and said horizontal recycle section, said pivotal, movable baffle plate adopted to constrict in a variable manner, at such location, the internal diameter of said vertical drop section, a set of at least one nonflexible baffle located on the bottom internal surface of and a set of at lest one nonflexible baffle located on the top internal surface of said horizontal section, said sets of nonflexible baffles being positioned in relation to each other so as to be in alternating sequence.

2. The apparatus as claimed in claim 1 wherein at least one nonflexible baffle is located on the top internal surface of said horizontal recycle section.

3. The apparatus as claimed in claim 2 wherein a nonflexible baffle is located on the internal wall of said vertical rise section opposite of said horizontal recycle section so as to be at or near the lower portion of the intersection of said vertical rise section and said horizontal recycle section.

4. The apparatus as claimed in claim 3 wherein a nonflexible baffle is located on the internal wall of said vertical drop section opposite of and below the intersection of said vertical drop section.

5. The apparatus as claimed in claim 1 wherein means for introducing a floc producing agent into said fluid or liquid in said conduit means upstream of said vertical drop section.

6. The apparatus as claimed in claim 1 wherein said means introducing a floc-producing agent comprises a plurality of injector jets spaced around the periphery of said conduit means upstream from said vertical drop section.

7. A combination of the mixing and flocculating device of claim 1 mounted on the bed of a truck or on a trailer.

8. The combination of claim 7 wherein a polymer mixing system and a means for adjusting the pH of the sewage are also mounted on said trailer, said polymer mixing system preparing an activated polymer solution and injecting said activated polymer solution into the inflow line of said mixing-flocculating device.

9. The combination of claim 7 wherein a generator is also mounted on said trailer to provide electrical power to operate said polymer mixing system and said means for adjusting the pH of the sewage.

* * * * *